(12) United States Patent
Yu et al.

(10) Patent No.: US 12,476,873 B2
(45) Date of Patent: Nov. 18, 2025

(54) METHOD AND APPARATUS FOR OBTAINING MAP OF INTERNET OF THINGS DEVICE

(71) Applicant: Beijing Xiaomi Mobile Software Co., Ltd., Beijing (CN)

(72) Inventors: Lei Yu, Beijing (CN); Mary-Luc Georges Henry Champel, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 386 days.

(21) Appl. No.: 17/924,893

(22) PCT Filed: May 15, 2020

(86) PCT No.: PCT/CN2020/090661
§ 371 (c)(1),
(2) Date: Nov. 11, 2022

(87) PCT Pub. No.: WO2021/227068
PCT Pub. Date: Nov. 18, 2021

(65) Prior Publication Data
US 2023/0198850 A1 Jun. 22, 2023

(51) Int. Cl.
*H04L 41/12* (2022.01)
*G16Y 30/00* (2020.01)
*G16Y 40/30* (2020.01)

(52) U.S. Cl.
CPC .............. *H04L 41/12* (2013.01); *G16Y 30/00* (2020.01); *G16Y 40/30* (2020.01)

(58) Field of Classification Search
CPC .......... H04L 41/12; G16Y 30/00; G16Y 40/30
See application file for complete search history.

(56) References Cited

U.S. PATENT DOCUMENTS

| | | |
|---|---|---|
| 1,653,178 A | 12/1927 | Hitt |
| 9,191,560 B2 | 11/2015 | Suzuki |
| 9,536,421 B2 | 1/2017 | Singhar et al. |
| 9,661,121 B2 | 5/2017 | Singhar et al. |
| 9,728,009 B2 | 8/2017 | Boussard et al. |
| 10,015,769 B1 | 7/2018 | Younis |
| 10,796,487 B2 | 10/2020 | Crews et al. |
| 10,812,936 B2 | 10/2020 | Reinhardt et al. |

(Continued)

FOREIGN PATENT DOCUMENTS

| | | |
|---|---|---|
| CN | 102880176 A | 1/2013 |
| CN | 104887155 A | 9/2015 |

(Continued)

OTHER PUBLICATIONS

European Patent Office, Extended European Search Report Issued in Application No. 20935515.5, Jan. 25, 2024, Germany, 7 pages.

(Continued)

*Primary Examiner* — Michael A Keller
(74) *Attorney, Agent, or Firm* — Volpe Koenig

(57) ABSTRACT

The present disclosure provides a method and apparatus for obtaining a map of an Internet of things device. The method is applicable to a first device with a camera and being moveable, and includes: determining a map of an area; and transmitting the map to a control system for controlling one or more IoT devices.

8 Claims, 18 Drawing Sheets

(56) References Cited

U.S. PATENT DOCUMENTS

| | | | |
|---|---|---|---|
| 10,866,584 | B2 | 12/2020 | Cella et al. |
| 11,267,131 | B2* | 3/2022 | Park .................. H04W 4/023 |
| 11,393,202 | B2 | 7/2022 | Waicberg et al. |
| 11,971,499 | B2 | 4/2024 | Choi et al. |
| 2004/0210346 | A1* | 10/2004 | Lee .................. G05D 1/0255 |
| | | | 318/568.12 |
| 2009/0265036 | A1* | 10/2009 | Jamieson ......... G05B 19/0426 |
| | | | 700/264 |
| 2011/0213664 | A1 | 9/2011 | Osterhout et al. |
| 2015/0310664 | A1 | 10/2015 | Boussard et al. |
| 2015/0327010 | A1 | 11/2015 | Gottschalk et al. |
| 2016/0239585 | A1 | 8/2016 | Leppanen et al. |
| 2016/0358459 | A1 | 12/2016 | Singhar et al. |
| 2017/0013112 | A1 | 1/2017 | Singhar et al. |
| 2018/0182172 | A1 | 6/2018 | Vinmani et al. |
| 2018/0213359 | A1 | 7/2018 | Reinhardt et al. |
| 2018/0349700 | A1 | 12/2018 | Percuoco et al. |
| 2019/0088030 | A1 | 3/2019 | Masterson et al. |
| 2019/0096131 | A1 | 3/2019 | Crews et al. |
| 2019/0096132 | A1 | 3/2019 | Crews et al. |
| 2019/0096133 | A1 | 3/2019 | Crews et al. |
| 2019/0202062 | A1 | 7/2019 | Park et al. |
| 2019/0311539 | A1 | 10/2019 | Hogue |
| 2020/0014600 | A1 | 1/2020 | Gupta et al. |
| 2020/0110934 | A1 | 4/2020 | Paul |
| 2021/0142565 | A1 | 5/2021 | Lekse et al. |

FOREIGN PATENT DOCUMENTS

| | | |
|---|---|---|
| CN | 105760106 A | 7/2016 |
| CN | 106033435 A | 10/2016 |
| CN | 106462238 A | 2/2017 |
| CN | 107690679 A | 2/2018 |
| CN | 107948917 A | 4/2018 |
| CN | 109559380 A | 4/2019 |
| CN | 208722145 U | 4/2019 |
| CN | 110199321 A | 9/2019 |
| CN | 110268225 A | 9/2019 |
| CN | 110325896 A | 10/2019 |
| CN | 110581781 A | 12/2019 |
| CN | 110955325 A | 4/2020 |
| EP | 3064899 A1 | 9/2016 |
| WO | 2018158123 A1 | 9/2018 |

OTHER PUBLICATIONS

State Intellectual Property Office of the People's Republic of China, Office Action and Search Report Issued in Application No. 2020800008933, Jan. 5, 2024, 10 pages.

European Patent Office, Extended European Search Report Issued in Application No. 20196664.5, Nov. 20, 2020, Germany, 8 pages.

ISA State Intellectual Property Office of the People's Republic of China, International Search Report Issued in Application No. PCT/CN2020/090661, Feb. 18, 2021, WIPO, 4 pages.

ISA State Intellectual Property Office of the People's Republic of China, International Search Report Issued in Application No. PCT/CN2020/090695, Feb. 18, 2021, WIPO, 5 pages.

State Intellectual Property Office of the People's Republic of China, Office Action and Search Report Issued in Application No. 2020800008933, Apr. 22, 2023, 18 pages.

Intellectual property India, Office Action Issued in Application No. 202247070520, Jan. 31, 2023, 6 pages.

ISA State Intellectual Property Office of the People's Republic of China, Written Opinion of the International Searching Authority Issued in Application No. PCT/CN2020/090661, Feb. 18, 2021, WIPO, 6 pages.

ISA State Intellectual Property Office of the People's Republic of China, Written Opinion of the International Searching Authority Issued in Application No. PCT/CN2020/090695, Feb. 18, 2021, WIPO, 3 pages.

State Intellectual Property Office of the People's Republic of China, Office Action and Search Report Issued in Application No. 2020800026842, Jul. 2, 2024, 24 pages.

State Intellectual Property Office of the People's Republic of China, Decision of Rejection Issued in Application No. 2020800008933, May 8, 2024, 20 pages.

United States Patent and Trademark Office ,non-final office action, Office Action Issued in U.S. Appl. No. 17/925,598, May 8, 2024, 31 pages.

Hou Shuwei et al, "The Control of Home Appliances Based on Intelligent Sight Perception and IoT", Electronics R & D, 10.3969/j.issn. 1000-0755.2013.06.001, 4 pages. (2013).

* cited by examiner

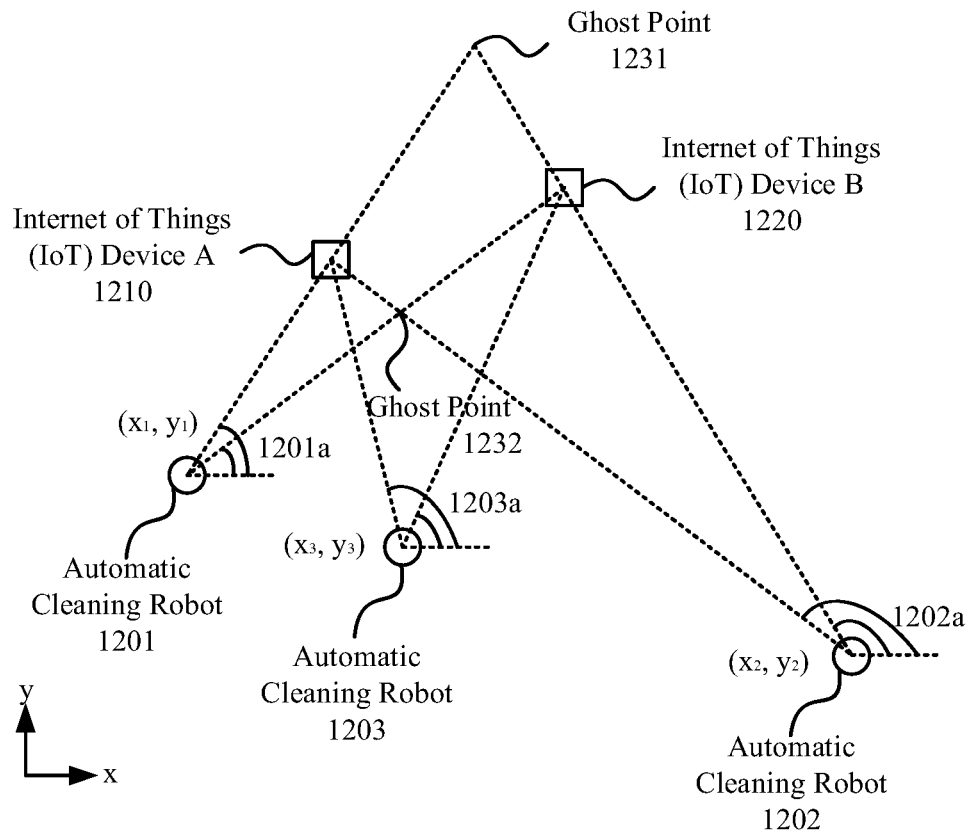

FIG. 13

| Obtain a first location of the first device when the IoT device is identified, a first angle between a first direction that the first device at the first location is oriented towards the IoT device and a preset direction, and depth information of the IoT device in an image obtained by the first device | ~ SF |

↓

| Determine a location of the IoT device according to the first location, the first angle and the depth information | ~ SG |

FIG. 14

METHOD AND APPARATUS FOR OBTAINING MAP OF INTERNET OF THINGS DEVICE

CROSS REFERENCE TO RELATED APPLICATIONS

This application is the national phase of International Application No. PCT/CN2020/090661 filed on May 15, 2020, the disclosure of which is hereby incorporated by reference in its entirety.

BACKGROUND

For IoT devices in smart homes, a user can control the IoT devices by issuing voice instructions while speaking. In order to analyze an IoT device specified by the voice instructions, it is necessary to analyze voice of the user first.

The voice instructions are mostly configured in the form of location and device. First, it is necessary for the user to manually label names of the IoT devices, and label locations of the IoT devices in the names; and then, the user can issue the voice instructions including the locations and the names. Further, the voice instructions are analyzed to determine the locations and devices included therein, so that a device at a corresponding location can be controlled. For example, a name of an IoT device in a voice instruction is a speaker (device) near a bedroom (location) in a living room, according to the voice instruction, it can be determined that an IoT device specified by the voice instruction is the speaker near the bedroom in the living room, therefore, the speaker can be controlled.

However, with the development of the smart homes, there are more and more IoT devices in the room. When labeling the names of the IoT devices one by one, it is necessary for the user to manually observe a layout of the room and a location of each IoT device in the room, so that the names can be accurately labeled, therefore, operations are relatively cumbersome.

SUMMARY

According to a first aspect of the embodiments of the present disclosure, there is provided a method for obtaining a map of an Internet of Things (IoT) device, being applicable to a first device with a camera and being moveable, the method including:
  determining a map of an area; and
  transmitting the map to a control system for controlling one or more IoT devices.

According to a second aspect of the embodiments of the present disclosure, there is provided a method for setting an identification of an Internet of Things (IoT) device, including:
  receiving a map of an area transmitted by a first device;
  determining a target location in the map;
  determining attribute information of an IoT device located at the target location; and
  generating an identification of the IoT device according to the target location and the attribute information.

According to a third aspect of the embodiments of the present disclosure, there is provided an electronic device, including:
  a processor; and
  a memory for storing instructions executable by the processor,
  wherein the processor is configured to implement the method for obtaining the map of the Internet of Things (IoT) device described in any of the above embodiments.

According to the fourth aspect of the embodiments of the present disclosure, there is provided an electronic device, including:
  a processor; and
  a memory for storing instructions executable by the processor,
  wherein the processor is configured to implement the method for setting the identification of the Internet of Things (IoT) device described in any of the above embodiments.

According to the fifth aspect of the embodiment of the present disclosure, a computer readable storage medium storing a computer program, wherein the computer program, when executed by a processor, causing the processor to implement the steps of the method for obtaining the map of the Internet of Things (IoT) device described in any of the above embodiments.

According to the sixth aspect of the embodiment of the present disclosure, a computer readable storage medium storing a computer program, wherein the computer program, when executed by a processor, causing the processor to implement the steps of the method for setting the identification of the Internet of Things (IoT) device described in any of the above embodiments.

BRIEF DESCRIPTION OF THE DRAWINGS

In order to explain the technical solutions more clearly in the embodiments of the present disclosure, the drawings required for the description of the embodiments will be briefly introduced below. It is obvious that the drawings in the following description are only some embodiments of the present disclosure. For those of ordinary skill in the art, other drawings can also be obtained based on these drawings, without paying any creative labor.

FIG. 13 is a schematic flowchart illustrating a method for determining a location of an Internet of Things (IoT) device according to an embodiment of the present disclosure.

FIG. 14 is a schematic flowchart illustrating a method for determining a location of an Internet of Things (IoT) device according to an embodiment of the present disclosure.

DETAILED DESCRIPTION OF THE EMBODIMENTS

The technical solutions in the embodiments of the present disclosure will be described clearly and completely below in combination with the drawings in the embodiments of the present disclosure. Obviously, the described embodiments are only part of the embodiments of the present disclosure, not all of them. Based on the embodiments in the disclosure, all other embodiments obtained by ordinary technicians in the art without doing creative work belong to the scope of the disclosure.

The present disclosure relates to the field of Internet of Things (IoT) technologies, and in particular to a method for obtaining a map of an Internet of Things (IoT) device, a method for setting an identification of an Internet of Things (IoT) device, an apparatus for obtaining a map of an Internet of Things (IoT) device, an apparatus for setting an identification of an Internet of Things (IoT) device, an electronic device and a computer readable storage medium.

Embodiments of the present disclosure provide a method for obtaining a map of an Internet of Things (IoT) device, a method for setting an identification of an Internet of Things (IoT) device, an apparatus for obtaining a map of an Internet of Things (IoT) device, an apparatus for setting an identification of an Internet of Things (IoT) device, an electronic device and a computer readable storage medium to solve technical problems in the related art.

Figure 1:
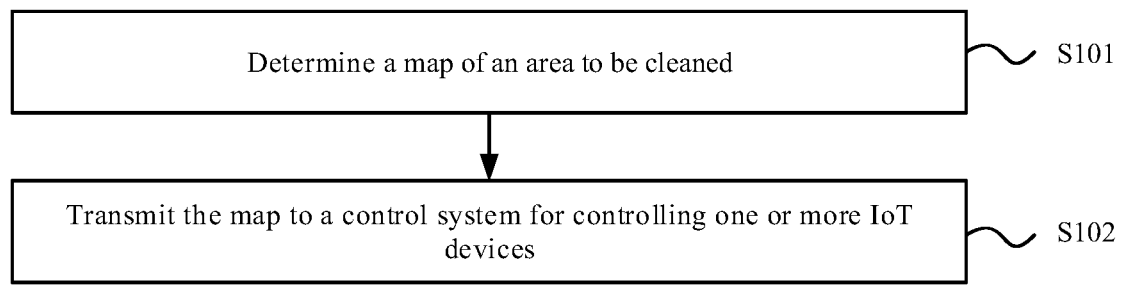
FIG. 1 is a schematic flowchart illustrating a method for obtaining a map of an Internet of Things (IoT) device according to an embodiment of the present disclosure.

FIG. 1 is a schematic flowchart illustrating a method for obtaining a map of an Internet of Things (IoT) device according to an embodiment of the present disclosure. The method shown in this embodiment can be applied to a first device with a camera and being moveable. The first device can be an automatic cleaning robot, a mobile terminal with a camera, or virtual reality (VR) glasses with a camera. Taking the automatic cleaning robot as an example, the automatic cleaning robot can automatically clean an area (for example, a room), determine a map of an area to be cleaned, and plan a cleaning route in the map. In processes of route planning and cleaning, the automatic cleaning robot can determine its own location and orientation.

For example, the automatic cleaning robot can usually confirm a distance from a boundary (for example, a wall) through infrared LED or lidar, and confirm a travel and an orientation through a path integral of a gyroscope, and then its own location and orientation can be confirmed. The embodiment of the present disclosure will be described below mainly for the first device to be the automatic cleaning robot.

As shown in FIG. 1, the method can include can include following steps.

In step S101, a map of an area to be cleaned is determined.

In step S102, the map is transmitted to a control system for controlling one or more IoT devices.

In one embodiment, the control system for controlling the IoT devices can be provided on a terminal of a user, and the terminal includes, but is not limited to, an electronic device such as a mobile phone, a tablet computer, a wearable device, and the like. The control system for controlling the IoT devices can also be provided in a cloud, and the user can log in to the control system for controlling the IoT devices provided in the cloud at the terminal. The control system for controlling the IoT devices can receive voice instructions from the user, and control the IoT devices recorded in the control system for controlling the IoT devices according to the voice instructions.

The automatic cleaning robot can transmit the map of the area to be cleaned to the control system for controlling the IoT devices, and the control system for controlling the IoT devices can display the map to the user, so that the user can operate in the map displayed by the control system for controlling the IoT devices, for example, selecting a location in the map to set an IoT device. Since the map includes location information, by setting the IoT device in the map, an identification (for example, name) of the IoT device can be generated in a way that the selected location is associated with the IoT device.

For example, if the user clicks an air conditioner at a location A in the map, an identification generated for the air conditioner can indicate the air conditioner at the location A. It should be noted that the location selected by the user can be indicated by coordinates in the map, and the map can include information of the area to which the coordinates belong, for example, the coordinates are located in a master bedroom, the coordinates are located in a living room, and the like. The specific coordinates can be associated with the IoT device to generate the identification of the IoT device (for example, a speaker with an abscissa of 40 and an ordinate of 50), or the area to which the coordinates belong can also be associated with the IoT device to generate the identification of the IoT device (for example, a speaker in a living room), so as to facilitate the user to generate voice instructions.

The first device can automatically determine the map of the area, and each location in the map has location information. Therefore, after the map is transmitted to the control system for controlling the IoT devices, when setting the identification of the IoT device in the control system for controlling the IoT devices, it is not necessary for the user to manually observe the layout of the area, but can directly set on the map to generate the identification of the IoT device according to the layout of the area determined by the map, thereby simplifying the process of generating the identification of the IoT device.

Figure 2:
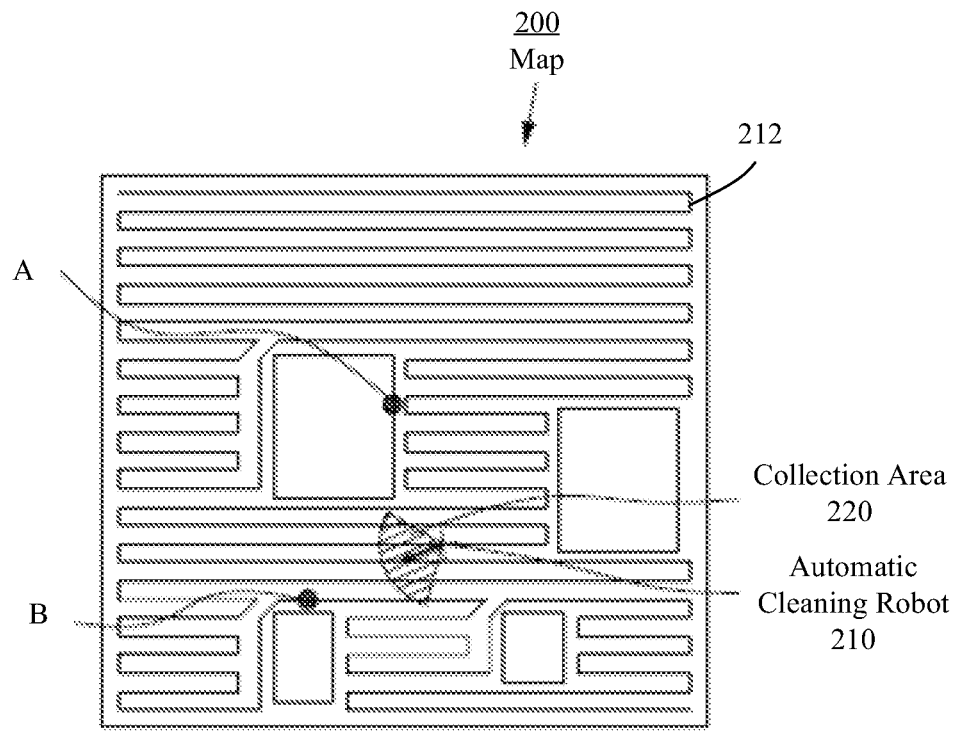
FIG. 2 is a schematic diagram illustrating an application scenario of a method for obtaining a map of an Internet of Things (IoT) device according to an embodiment of the present disclosure.

FIG. 2 is a schematic diagram illustrating an application scenario of a method for obtaining a map of an Internet of Things (IoT) device according to an embodiment of the present disclosure.

As shown in FIG. 2, for example, the control system for controlling the IoT devices is set in the mobile phone of the user, and the user can view the map 200 from the automatic cleaning robot 210 through the control system for controlling the IoT devices in the mobile phone. Besides display of the layout of the area to be cleaned, the cleaning route 212, a cleaning area, a cleaning time of the automatic cleaning robot can be selectively displayed in the map. The automatic cleaning robot can collect images for what is in front of it, images of one or more objects entering a collection area 220 can be captured by the automatic cleaning robot, and the automatic cleaning robot can determine whether the objects are the IoT devices according to the images.

The user can select a location in the map. After the location is selected by the user, a menu including one or more candidate IoT devices can be generated, and the user can further select an IoT device to be set at this location in the menu. For example, after a location A is selected by the user, the user can further select a speaker as an IoT device set in this location A, since the location A belongs to a living room, an identification generated for the IoT device is "the speaker in the living room". For example, after a location B is selected by the user, the use can select a refrigerator as an IoT device set in this location B, since the location B belongs to a kitchen, an identification generated for the IoT device is "the refrigerator in the kitchen".

When it is necessary to control the IoT device later, the user can output voice instructions by speaking, and the control system for controlling the IoT devices can receive the voice instructions and analyze the voice instructions to determine the IoT device to be controlled. For example, a voice instruction output by the user is "open the speaker in the living room", and the control system for controlling the IoT devices can determine that the user wants to start the speaker in the living room by analyzing the voice instruction, so that the speaker in the living room can be started.

In some examples, the first device can be one of:
an automatic cleaning robot,
a mobile terminal with a camera, or
virtual reality (VR) glasses with a camera.

In one embodiment, the first device can be not only the automatic cleaning robot, but also the mobile terminal with a camera, or the VR glasses with a camera. The images of the area can be collected through these first devices, and the map of the area can be generated based on the collected images.

Figure 3:
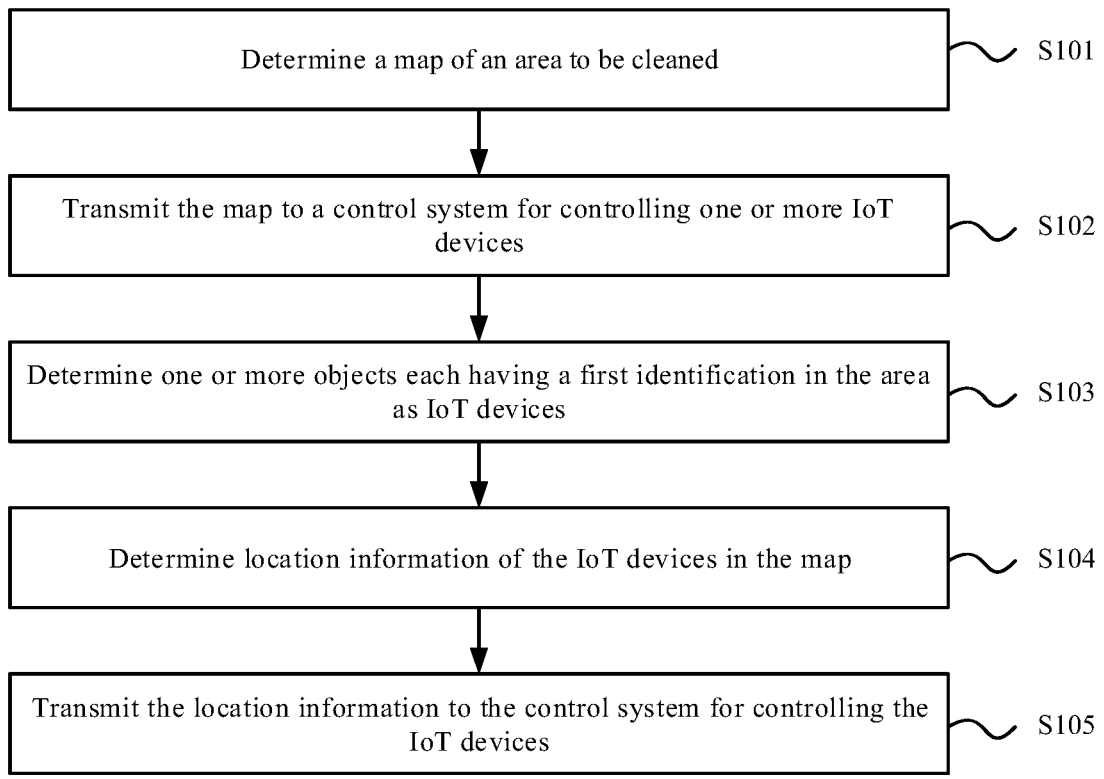
FIG. 3 is a schematic flowchart illustrating a method for obtaining a map of an Internet of Things (IoT) device according to an embodiment of the present disclosure.

FIG. 3 is a schematic flowchart illustrating a method for obtaining a map of an Internet of Things (IoT) device according to an embodiment of the present disclosure. As shown in FIG. 3, the method includes following steps.

In step S103, one or more objects each having a first identification in the area are determined as IoT devices.

In step S104, location information of the IoT devices in the map is determined.

In step S105, the location information is transmitted to the control system for controlling the IoT devices.

In one embodiment, each of the IoT devices can be provided with the first identification for indicating that the object provided with the first identification is an IoT device. The automatic cleaning robot can determine the object with the first identification in one or more objects in the area as the IoT device. For example, the first identification can be identified based on the images, or through other methods such as near field communication (NFC).

After identifying the first identification, the automatic cleaning robot can determine which locations in the map have IoT devices (but specific attributes such as types and models of the IoT devices cannot be determined yet), that is, location information of the IoT devices in the map; and then transmit the determined location information to the control system. The control system can generate location identifications in the map (for example, at locations corresponding to the location information in the map) according to the location information, so that the map seen by the user can include the location identifications. Since the location identifications are generated according to the location information, corresponding location information can be viewed by operating the location identifications, so that the locations of the IoT devices in the area can be determined. The process of determining the location information of the IoT devices in the map does not require manual participation, thereby simplifying the operation.

Figure 4:
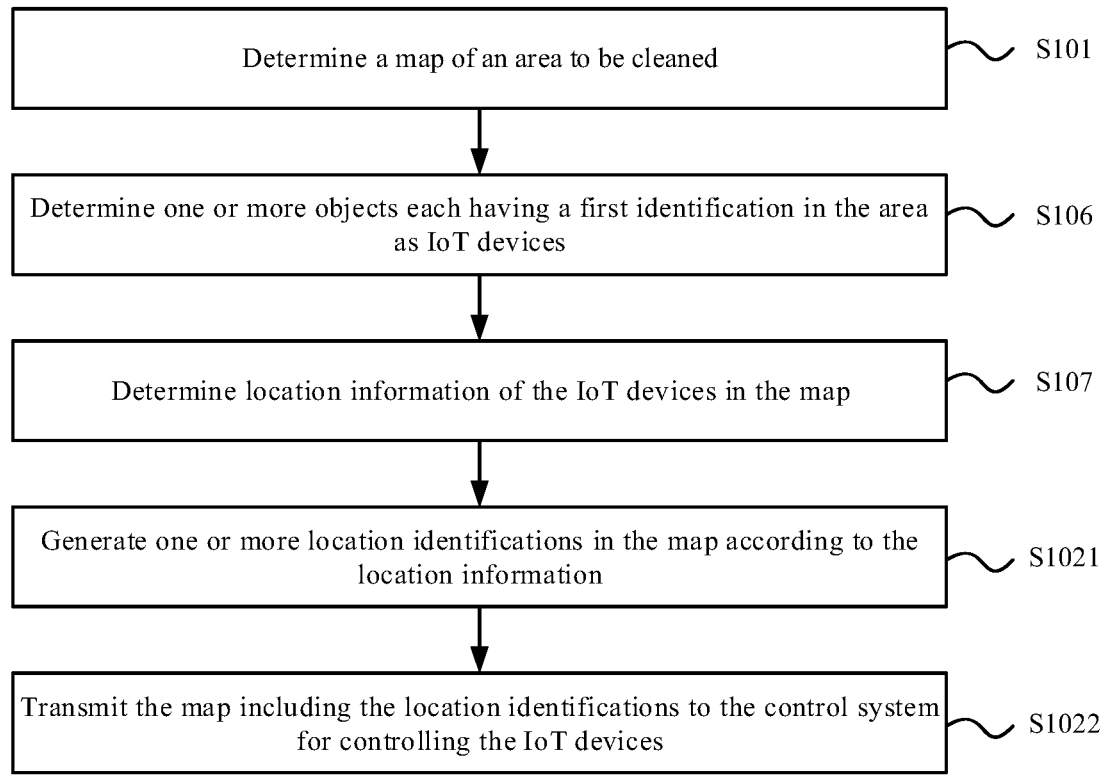
FIG. 4 is a schematic flowchart illustrating a method for obtaining a map of an Internet of Things (IoT) device according to an embodiment of the present disclosure.

FIG. 4 is a schematic flowchart illustrating a method for obtaining a map of an Internet of Things (IoT) device according to an embodiment of the present disclosure. As shown in FIG. 4, the method includes following steps.

In step S106, one or more objects each having a first identification in the area are determined as IoT devices.

In step S107, location information of the IoT devices in the map is determined.

Transmitting the map to the control system for controlling the IoT devices includes following steps.

In step S1021, one or more location identifications are generated in the map according to the location information.

In step S1022, the map including the location identifications is transmitted to the control system for controlling the IoT devices.

In one embodiment, each of the IoT devices can be provided with the first identification for indicating that the object provided with the first identification is an IoT device. The automatic cleaning robot can determine the object with the first identification in one or more objects in the area as the IoT device. For example, the first identification can be identified based on the images, or through other methods such as near field communication.

After identifying the first identification, the automatic cleaning robot can determine which locations in the map have IoT devices (but specific attributes such as types and models of the IoT devices cannot be determined yet), generate location identifications in the map (for example, at locations corresponding to the location information in the map) according to the location information, and then transmit the map including the location identifications to the control system for controlling the IoT devices, so that the map seen by the user can include the location identifications. Since the location identifications are generated according to the location information, corresponding location information can be viewed by operating the location identifications, so that the locations of the IoT devices in the area can be determined. The process of determining the location information of the IoT devices in the map does not require manual participation, thereby simplifying the operation.

Figure 5:
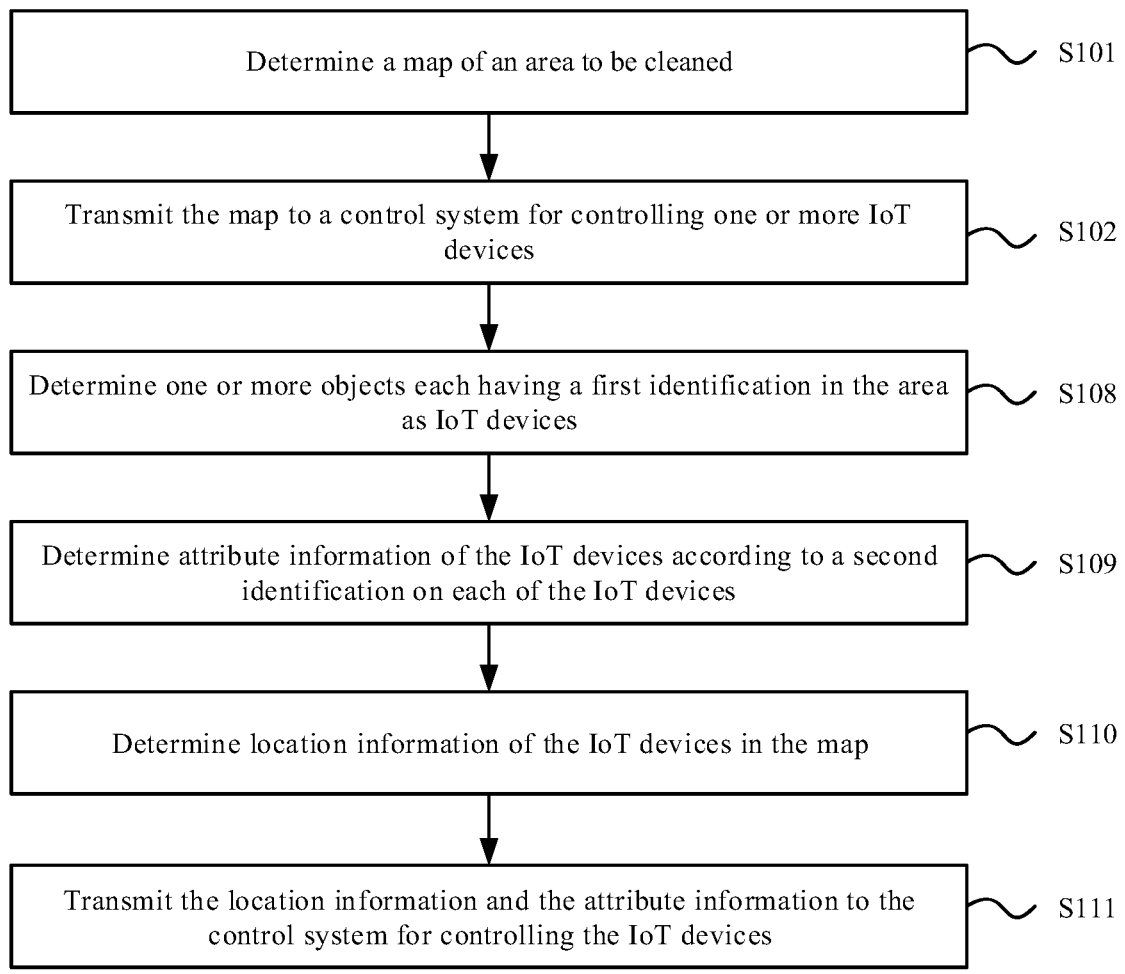
FIG. 5 is a schematic flowchart illustrating a method for obtaining a map of an Internet of Things (IoT) device according to an embodiment of the present disclosure.

FIG. 5 is a schematic flowchart illustrating a method for obtaining a map of an Internet of Things (IoT) device according to an embodiment of the present disclosure. As shown in FIG. 5, the method includes following steps.

In step S108, one or more objects each having a first identification in the area are determined as IoT devices.

In step S109, attribute information of the IoT devices is determined according to a second identification on each of the IoT devices.

In step S110, location information of the IoT devices in the map is determined.

In step S111, the location information and the attribute information are transmitted to the control system for controlling the IoT devices.

In one embodiment, each of the IoT devices can be provided with the first identification and the second identification, where the first identification can indicate that the object provided with the first identification is an IoT device, and the second identification can indicate the attribute information (for example, types, models, and the like) of the object provided with the second identification. The automatic cleaning robot can determine the object with the first identification in one or more objects in the area as the IoT device, and further determine the second identification on the IoT device. For example, the first identification and the second identification can be identified based on the images, or through other methods such as near field communication.

In all embodiments of the present disclosure, the control system for controlling the IoT devices can be any device or a program stored in the device. The device or the program can transmit data and control instructions to the IoT devices.

In all embodiments of the present disclosure, the control system for controlling the IoT devices can be built in an IoT device, or can be a device independent of all IoT devices, or can be a terminal device of the user, for example, an intelligent mobile terminal, a tablet computer, a computer, or any device with communication and processing capabilities. The user can view information in the control system for controlling the IoT devices, for example, the map received by the control system for controlling the IoT devices and information in the map.

After identifying the first identification and the second identification, the automatic cleaning robot can determine which locations in the map have IoT devices, that is, location information of the IoT devices in the map; determine attribute information of each of the IoT devices according to the second identification, and then transmit the determined location information and attribute information to the control system for controlling the IoT devices. The control system for controlling the IoT devices can generate location identifications in the map according to the location information, and associate the location identifications with the attribute information, so that the map seen by the user can include the location identifications. Since the location identifications are generated according to the location information and are associated with the attribute information, corresponding location information and attribute information can be viewed by operating the location identifications, so that the locations and specific attributes of the IoT devices in the area can be determined. The process of determining the location information and the attribute information of the IoT devices in the map does not require manual participation, thereby simplifying the operation.

Figure 6:
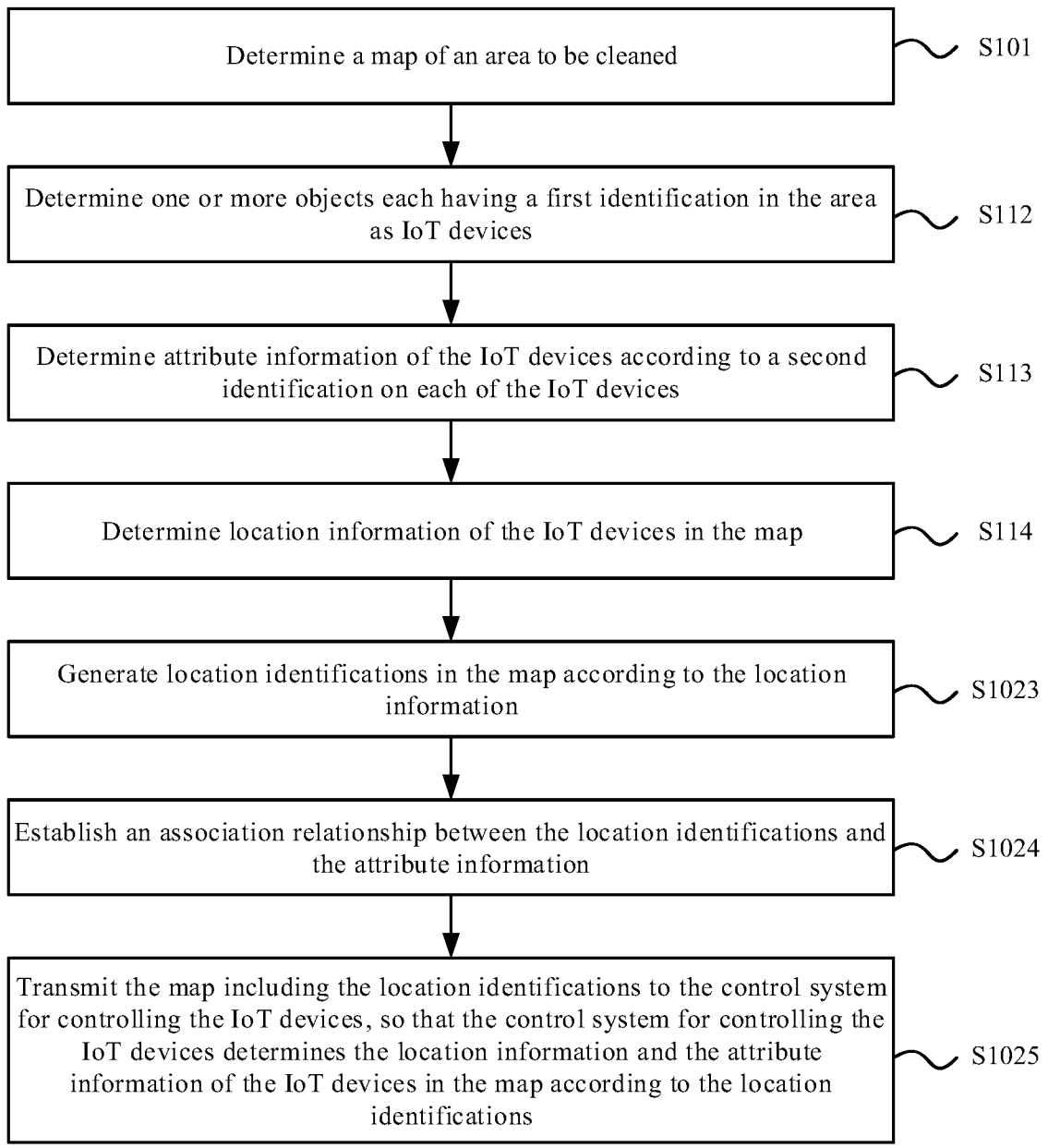
FIG. 6 is a schematic flowchart illustrating a method for obtaining a map of an Internet of Things (IoT) device according to an embodiment of the present disclosure.

FIG. 6 is a schematic flowchart illustrating a method for obtaining a map of an Internet of Things (IoT) device according to an embodiment of the present disclosure. As shown in FIG. 6, the method includes following steps.

In step S112, one or more objects each having a first identification in the area are determined as IoT devices.

In step S113, attribute information of the IoT devices is determined according to a second identification on each of the IoT devices.

In step S114, location information of the IoT devices in the map is determined.

Transmitting the map to the control system for controlling the IoT devices includes following steps.

In step S1023, location identifications are generated in the map according to the location information.

In step S1024, an association relationship between the location identifications and the attribute information is established.

In step S1025, the map including the location identifications is transmitted to the control system for controlling the IoT devices, so that the control system for controlling the IoT devices determines the location information and the attribute information of the IoT devices in the map according to the location identifications.

In one embodiment, each of the IoT devices can be provided with the first identification and the second identification, where the first identification can indicate that the object provided with the first identification is the IoT device, and the second identification can indicate the attribute information (for example, types, models, and the like) of the object provided with the second identification. The automatic cleaning robot can determine the object with the first identification in one or more objects in the area as the IoT device, and further determine the second identification on the IoT device. For example, the first identification and the second identification can be identified based on the images, or through other methods such as near field communication.

After identifying the first identification and the second identification, the automatic cleaning robot can determine which locations in the map have IoT devices, that is, location information of the IoT devices in the map; determine attribute information of each of the IoT devices according to the second identification, generate location identifications in the map according to the location information, establish the association relationship between the location identifications and the attribute information, and transmit the map including the location identifications to the control system for controlling the IoT devices, so that the map seen by the user can include the location identifications. Since the location identifications are generated according to the location information and are associated with the attribute information, corresponding location information and attribute information can be viewed by operating the location identifications, so that the locations and specific attributes of the IoT devices in the area can be determined. The process of determining the location information and the attribute information of the IoT devices in the map does not require manual participation, thereby simplifying the operation.

It should be noted that the first identification and the second identification in the above embodiment can be set on an IoT device in the form of patterns, therefore, the automatic cleaning robot can first obtain images of the object, and then determine whether the first identification and the second identification are set on the IoT device by identifying the images. The first identification and the second identification in the above embodiment can also be set on an IoT device in the form of hardware structure. For example, both the first identification and the second identification are cards that can be identified through near field communication. Thus, the automatic cleaning robot can be equipped with a near field identification antenna. When approaching the IoT device, the automatic cleaning robot can identify the first identification and the second identification by the near field identification antenna.

In addition, the first identification and the second identification can be two independent identifications or an integrated identification.

Figure 7:
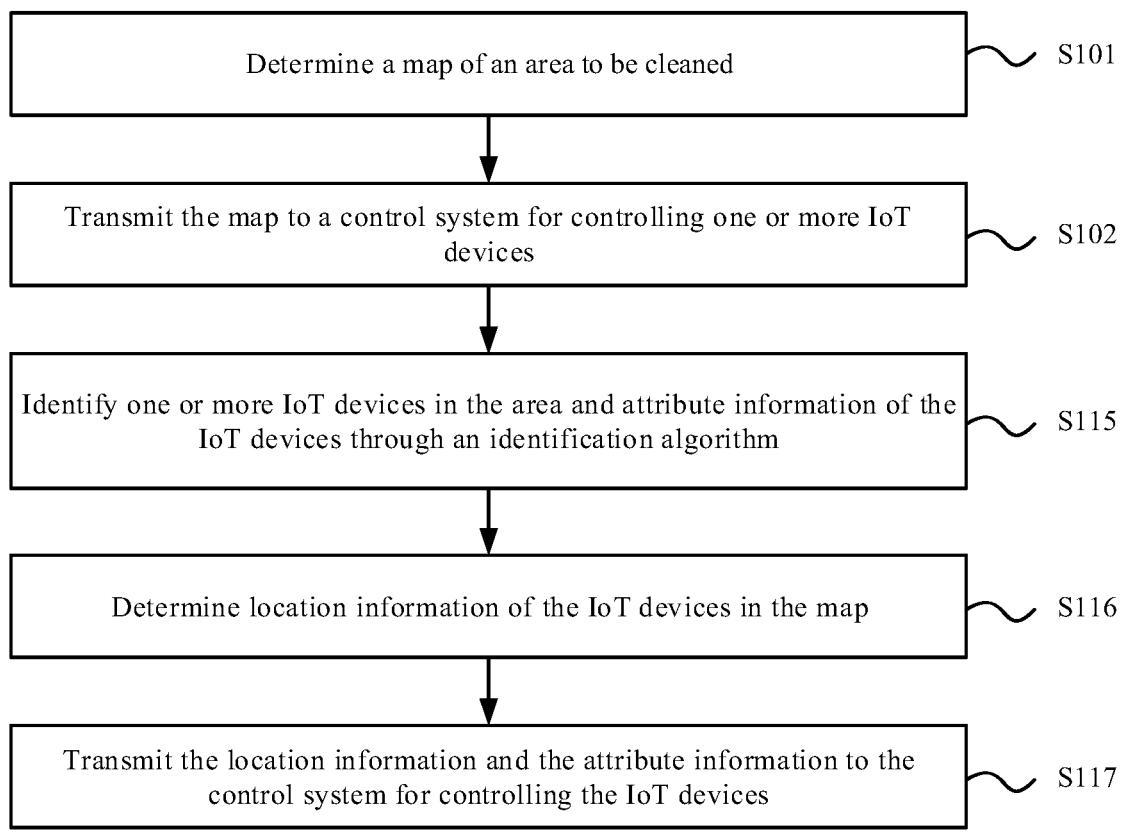
FIG. 7 is a schematic flowchart illustrating a method for obtaining a map of an Internet of Things (IoT) device according to an embodiment of the present disclosure.

FIG. 7 is a schematic flowchart illustrating a method for obtaining a map of an Internet of Things (IoT) device according to an embodiment of the present disclosure. As shown in FIG. 7, the method includes following steps.

In step S115, one or more IoT devices in the area and attribute information of the IoT devices are identified through an identification algorithm.

In step S116, location information of the IoT devices in the map is determined.

In step S117, the location information and the attribute information are transmitted to the control system for controlling the IoT devices.

In one embodiment, the automatic cleaning robot can identify one or more IoT devices in the area and attribute information (such as types and models) of the IoT devices through the identification algorithm (for example, a model obtained by machine learning). After identifying the attribute information of the IoT devices, the automatic cleaning robot can determine the location information of the IoT devices, and then transmit the determined location information and attribute information to the control system. The control system for controlling the IoT devices can generate location identifications in the map according to the location information, and associate the location identifications with attribute information, so that the map seen by the user can include the location identifications. Since the location identifications are generated according to the location information and are associated with the attribute information, corresponding location information and attribute information can be viewed by operating the location identifications, so that the locations and specific attributes of the IoT devices in the area can be determined. The process of determining the location information and the attribute information of the IoT devices in the map does not require manual participation, thereby simplifying the operation.

Figure 8:
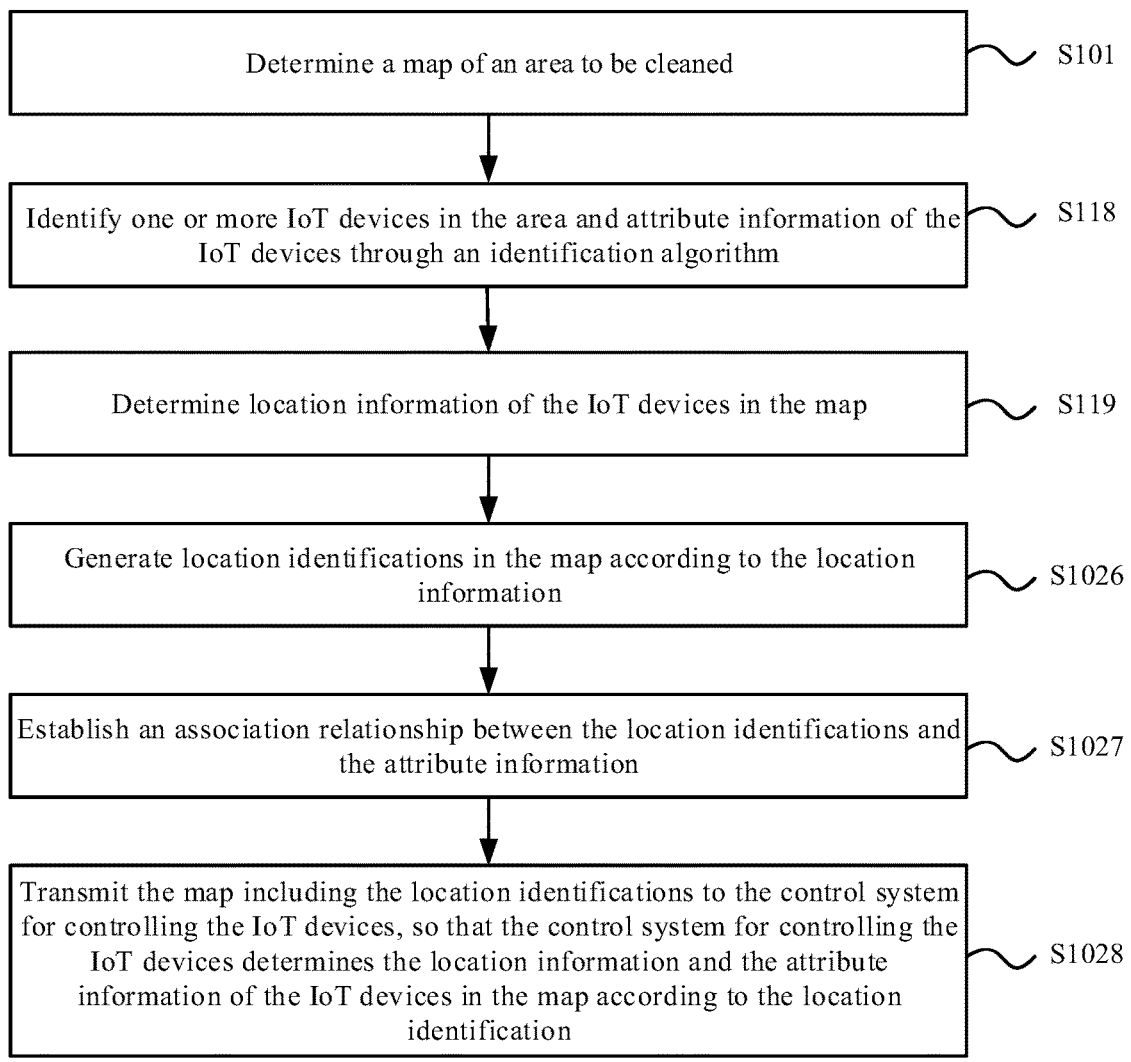
FIG. 8 is a schematic flowchart illustrating a method for obtaining a map of an Internet of Things (IoT) device according to an embodiment of the present disclosure.

FIG. 8 is a schematic flowchart illustrating a method for obtaining a map of an Internet of Things (IoT) device according to an embodiment of the present disclosure. As shown in FIG. 8, the method includes following steps.

In step S118, one or more IoT devices in the area and attribute information of the IoT devices are identified through an identification algorithm.

In step S119, location information of the IoT devices in the map is determined.

Transmitting the map to the control system for controlling the IoT devices includes following steps.

In step S1026, location identifications are generated in the map according to the location information.

In step S1027, an association relationship between the location identifications and the attribute information is established.

In step S1028, the map including the location identifications is transmitted to the control system for controlling the IoT devices, so that the control system for controlling the IoT devices determines the location information and the attribute information of the IoT devices in the map according to the location identification.

In one embodiment, the automatic cleaning robot can identify one or more IoT devices in the area and attribute information (such as types and models) of the IoT devices through the identification algorithm (for example, a model obtained by machine learning). After identifying the attribute information of the IoT devices, the automatic cleaning robot can determine the location information of the IoT devices, generate location identifications in the map according to the location information, establish the association relationship between location identifications with attribute information, and then transmit the map including the location identifications to the control system for controlling the IoT devices, so that the map seen by the user can include the location identifications. Since the location identifications are generated according to the location information and are associated with the attribute information, corresponding location information and attribute information can be viewed by operating the location identifications, so that the locations and specific attributes of the IoT devices in the area can be determined. The process of determining the location information and the attribute information of the IoT devices in the map does not require manual participation, thereby simplifying the operation.

Figure 9:
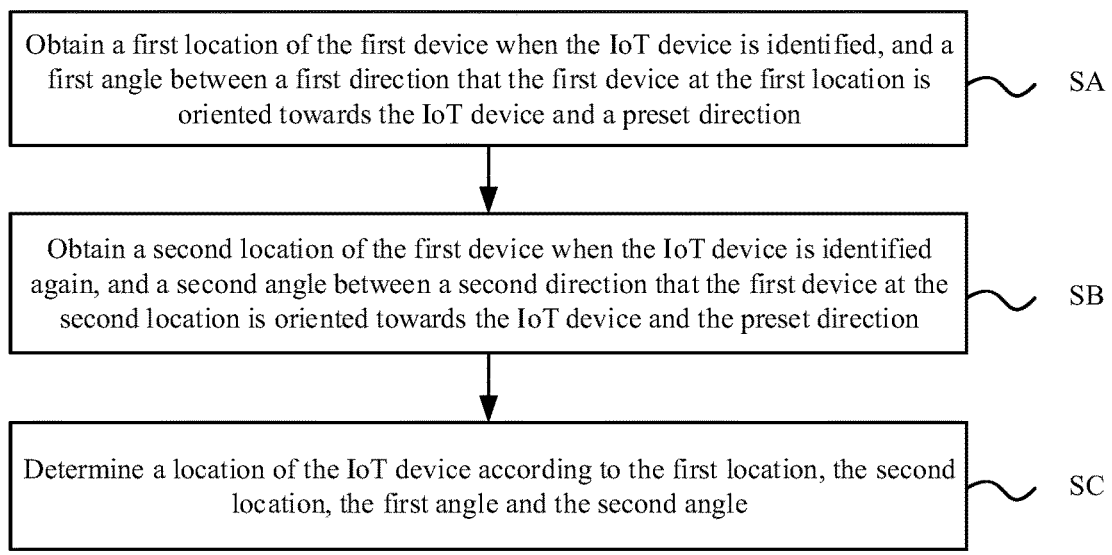
FIG. 9 is a schematic flowchart illustrating a method for determining a location of an Internet of Things (IoT) device according to an embodiment of the present disclosure.
Figure 10:
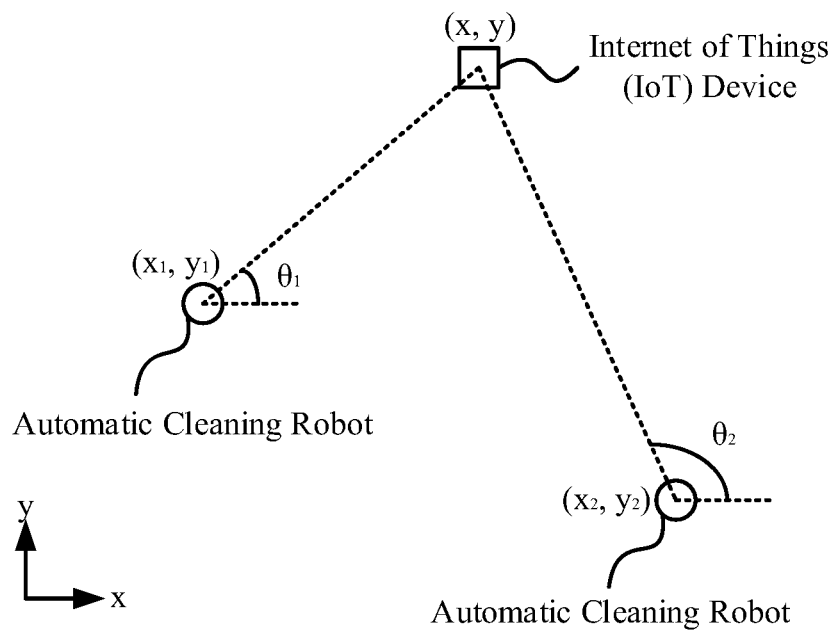
FIG. 10 is a schematic flowchart illustrating a method for determining a location of an Internet of Things (IoT) device according to an embodiment of the present disclosure.

FIG. 9 is a schematic flowchart illustrating a method for determining a location of an Internet of Things (IoT) device according to an embodiment of the present disclosure. FIG. 10 is a schematic flowchart illustrating a method for determining a location of an Internet of Things (IoT) device according to an embodiment of the present disclosure. As shown in FIG. 9, determining the location information of the IoT devices in the map includes following steps.

In step SA, for each of the IoT devices, a first location of the first device when the IoT device is identified, and a first angle between a first direction that the first device at the first location is oriented towards the IoT device and a preset direction are obtained.

In step SB, a second location of the first device when the IoT device is identified again, and a second angle between a second direction that the first device at the second location is oriented towards the IoT device and the preset direction are obtained.

In step SC, a location of the IoT device is determined according to the first location, the second location, the first angle and the second angle.

In one embodiment, when identifying the IoT device, the automatic cleaning robot can record a location of the automatic cleaning robot and an angle between a direction that the automatic cleaning robot is oriented towards the IoT device and the preset direction. Further, in response to identifying the IoT device twice, the automatic cleaning robot can record the first location and the second location, as well as the first angle and the second angle.

As shown in FIG. 10, coordinates of the first location are $(x_1, y_1)$, coordinates of the second location are $(x_2, y_2)$, the first angle is $\theta_1$, and the second angle is $\theta_2$, where a location $(x, y)$ of the identified IoT device is unknown, equations about the location of the identified IoT device are established based on the first location, the second location, the first angle and the second angle. For example, the equations can be as follows:

$(y-y_1)/(x-x_1)=\tan \theta_1$; $(y-y_2)/(x-x_2)=\tan \theta_2$. By solving the equations in two variables, an abscissa x and an ordinate y of the location of the IoT device can be determined, and then the location (x, y) of the IoT device can be determined.

Figure 11:
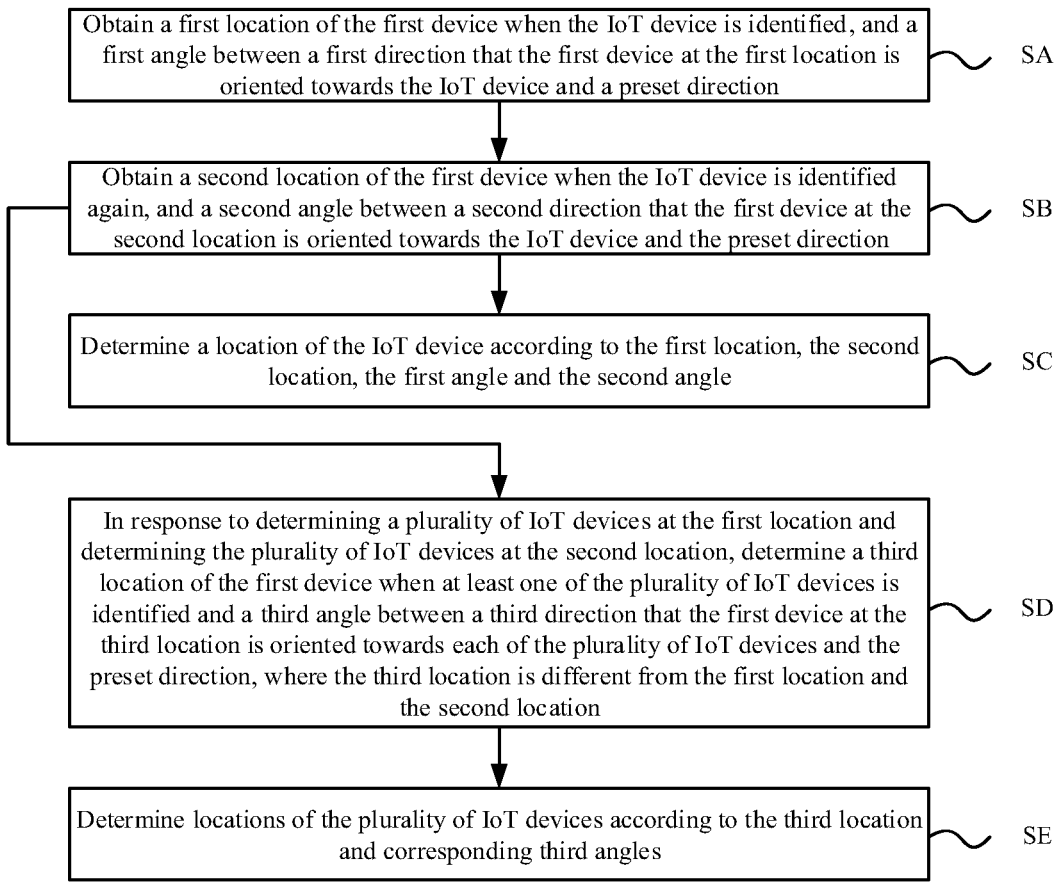
FIG. 11 is a schematic flowchart illustrating a method for determining a location of an Internet of Things (IoT) device according to an embodiment of the present disclosure.
Figure 12:
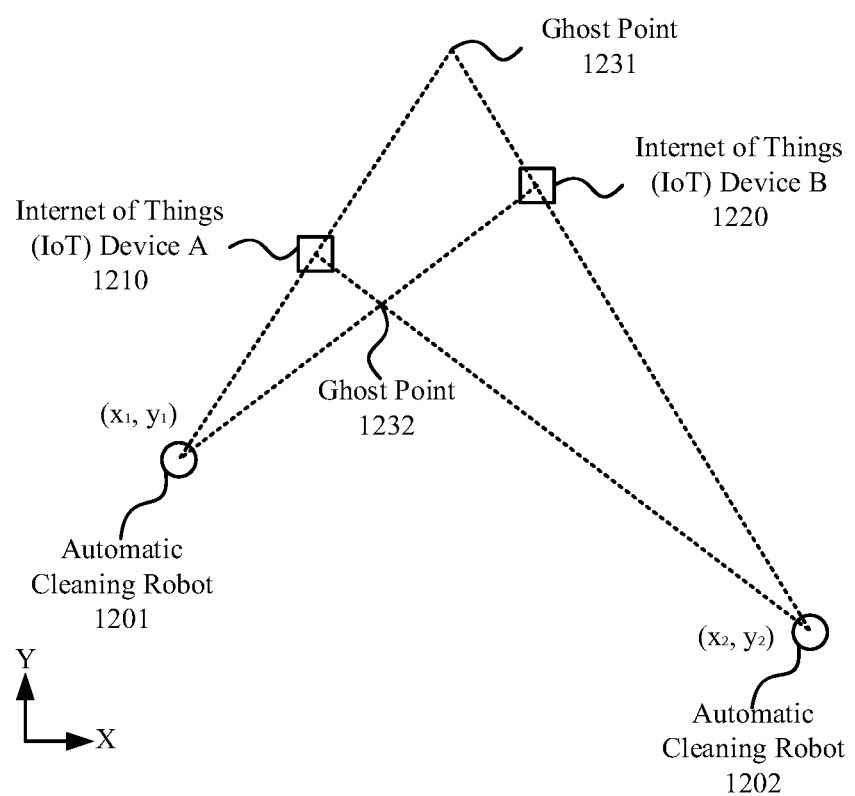
FIG. 12 is a schematic flowchart illustrating a method for determining a location of an Internet of Things (IoT) device according to an embodiment of the present disclosure.

FIG. 11 is a schematic flowchart illustrating a method for determining a location of an Internet of Things (IoT) device according to an embodiment of the present disclosure. FIG. 12 is a schematic flowchart illustrating a method for determining a location of an Internet of Things (IoT) device according to an embodiment of the present disclosure. FIG. 13 is a schematic flowchart illustrating a method for determining a location of an Internet of Things (IoT) device according to an embodiment of the present disclosure. As shown in FIG. 11, determining the location information of the IoT devices in the map further includes following steps.

In step SD, in response to determining a plurality of IoT devices at the first location and determining the plurality of IoT devices at the second location, a third location of the first device when at least one of the plurality of IoT devices is identified and a third angle between a third direction that the first device at the third location is oriented towards each of the plurality of IoT devices and the preset direction are determined, where the third location is different from the first location and the second location.

In step SE, locations of the plurality of IoT devices are determined according to the third location and corresponding third angles.

In one embodiment, the automatic cleaning robot may determine a plurality of IoT devices when the automatic cleaning robot is at the first location and determine the plurality of IoT devices when the automatic cleaning robot is at the second location, and at this time, there may be one or more ghost points. For example, as shown in FIG. 12, when the automatic cleaning robot determines two IoT devices (i.e., an IoT device A 1210 and an IoT device B 1220) at the first location 1201 and the second location 1202, there will be two ghost points 1231, 1232. The ghost points are also included in the calculated coordinates of the IoT devices, however, there is actually no IoT device A or IoT device B at the ghost points.

Then, when at least one of the plurality of IoT devices is identified, a third location of the first device and a third angle between a third direction that the first device at the third location is oriented towards the IoT device and the preset direction can be further determined. It should be noted that the third location is different from the first location and the second location, therefore, the locations of the plurality of IoT devices can be determined according to the third location and the third angle.

As shown in FIG. 13, the automatic cleaning robot can determine two IoT devices 1210, 1220 at the third location 1203, and then combine coordinates of the third location and the third angle 1203a with the coordinates of the first location 1201 and the second location 1202, the first angle 1201a and the second angle 1202a to form simultaneous equations. Therefore, the locations obtained by solving the simultaneous equations are two points where the three dotted lines shown in FIG. 13 intersect, that is, the locations where the IoT device A and the IoT device B actually exist. Therefore, the ghost points can be eliminated to accurately determine the locations of the IoT devices.

FIG. 14 is a schematic flowchart illustrating a method for determining a location of an Internet of Things (IoT) device according to an embodiment of the present disclosure. As shown in FIG. 14, determining the location information of the IoT devices in the map includes following steps.

In step SF, for each of the IoT devices, a first location of the first device when the IoT device is identified, a first angle between a first direction that the first device at the first location is oriented towards the IoT device and a preset direction, and depth information of the IoT device in an image obtained by the first device are obtained.

In step SG, a location of the IoT device is determined according to the first location, the first angle and the depth information.

In one embodiment, the automatic cleaning robot can be provided with a structure for identifying the depth information, for example, a binocular camera, so that the depth information of the IoT devices in the images can be determined when the images including the IoT devices are collected, and then the locations of the IoT device can be determined according to the first location, the first angle and the depth information.

A distance between the IoT device and the automatic cleaning robot can be determined according to the depth information, and a direction of the IoT device relative to the automatic cleaning robot can be determined according to the first angle, therefore, a vector from the automatic cleaning robot to the IoT device can be determined according to the distance and the direction. Since the first location can be determined, the location of the IoT device is the first location plus the vector.

Figure 15:
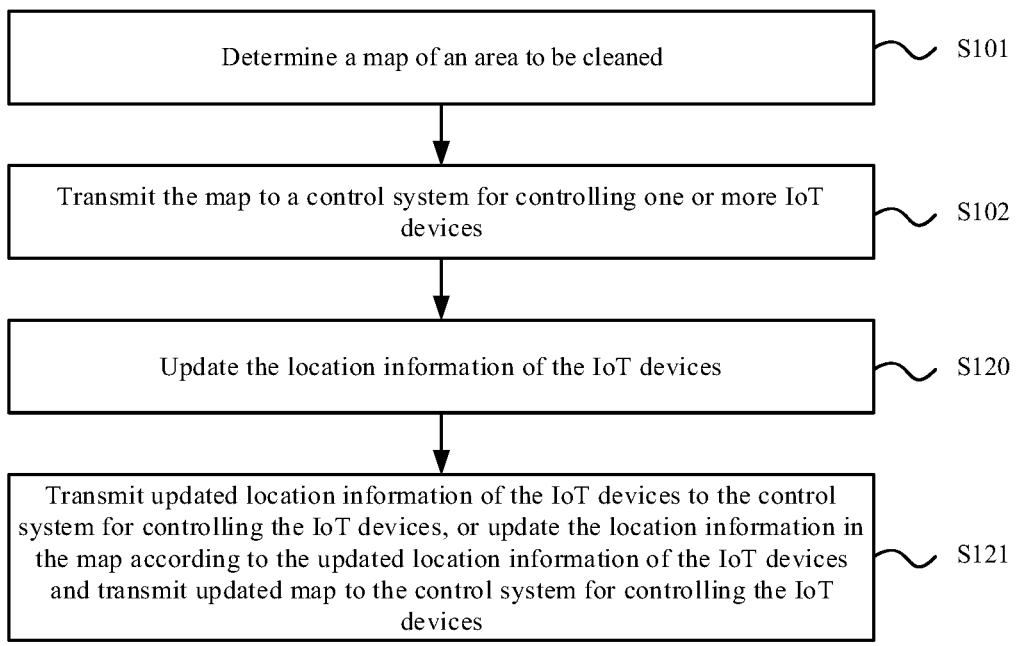
FIG. 15 is a schematic flowchart illustrating a method for obtaining a map of an Internet of Things (IoT) device according to an embodiment of the present disclosure.

FIG. 15 is a schematic flowchart illustrating a method for obtaining a map of an Internet of Things (IoT) device according to an embodiment of the present disclosure. As shown in FIG. 15, the method further includes following steps.

In step S120, the location information of the IoT devices is updated.

In step S121, updated location information of the IoT devices is transmitted to the control system for controlling the IoT devices, or the location information in the map is updated according to the updated location information of the IoT devices and updated map is transmitted to the control system for controlling the IoT devices.

In one embodiment, for each of the IoT devices, after determining the location of the IoT device, the automatic cleaning robot can also update (for example, periodically or aperiodically) the location of the IoT device. Since the location of the IoT device in the area can change, a location determined each time can be different from a location determined last time. Further, the updated location of the IoT device can be transmitted to the control system for controlling the IoT devices, or the location information in the map can be updated according to the updated location information of the IoT devices and an updated map can be transmitted to the control system for controlling the IoT devices, therefore, the location of the IoT device in the map can be updated, so that the map can accurately display the location of the IoT device.

Figure 16:
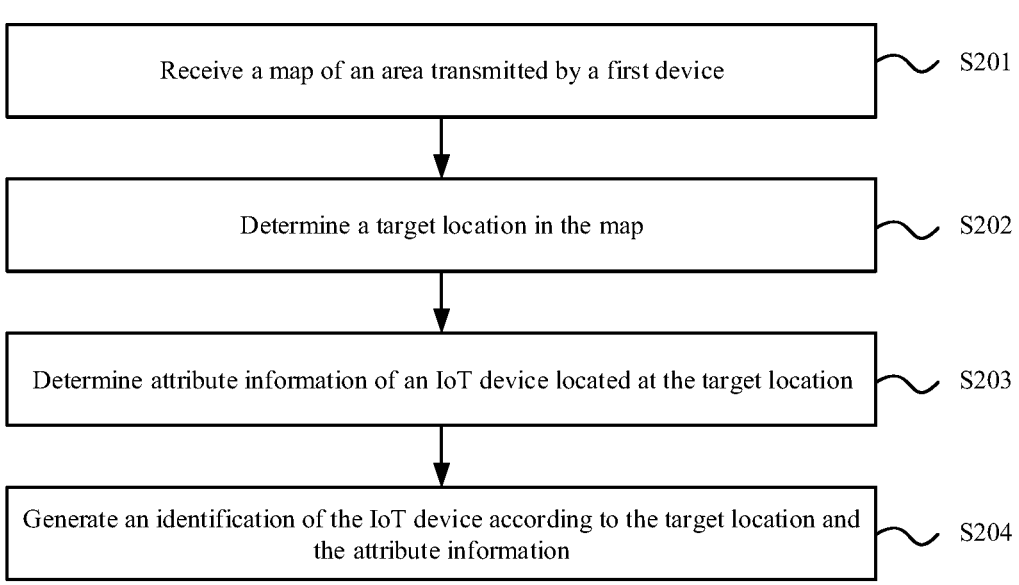
FIG. 16 is a schematic flowchart illustrating a method for setting an identification of an Internet of Things (IoT) device according to an embodiment of the present disclosure.

FIG. 16 is a schematic flowchart illustrating a method for setting an identification of an Internet of Things (IoT) device according to an embodiment of the present disclosure. The method shown in this embodiment can be applied to a control system for controlling one or more IoT devices. The control system for controlling the IoT devices can communicate with the first device described in any of the above embodiments. The embodiment of the present disclosure will be described below mainly for the first device to be the automatic cleaning robot.

As shown in FIG. 16, the method can include following steps.

In step S201, a map of an area transmitted by a first device is received.

In step S202, a target location in the map is determined.

In step S203, attribute information of an IoT device located at the target location is determined.

In step S204, an identification of the IoT device is generated according to the target location and the attribute information.

In one embodiment, the automatic cleaning robot can transmit the map of the area to be cleaned to the control system for controlling the IoT devices. The control system for controlling the IoT devices can determine the target location in the map and the attribute information of the IoT device located at the target location, for example, the control system for controlling the IoT devices can determine the target location and the attribute information of the IoT device located at the target location through a preset algorithm; or can also show the map to the user, and the user can operate in the map shown by the control system for controlling the IoT devices, for example, determining the target location of the IoT device in the map by inputting a first instruction, and determining the IoT device located at the target location by inputting a second instruction (for example, selecting the attribute of the IoT device located at the target location), and then the identification of the IoT device is generated according to the target location and the attribute.

Since the first device can automatically determine the map of the area to be cleaned, and each location in the map has location information. Therefore, after the map is transmitted to the control system for controlling the IoT devices, when setting the identification of the IoT device in the control system for controlling the IoT devices, it is not necessary for the user to manually observe a layout of the area, but can directly set on the map to generate the identification of the IoT device according to the layout of the area determined by the map, thereby simplifying the process of generating the identification of the IoT device.

Figure 17:
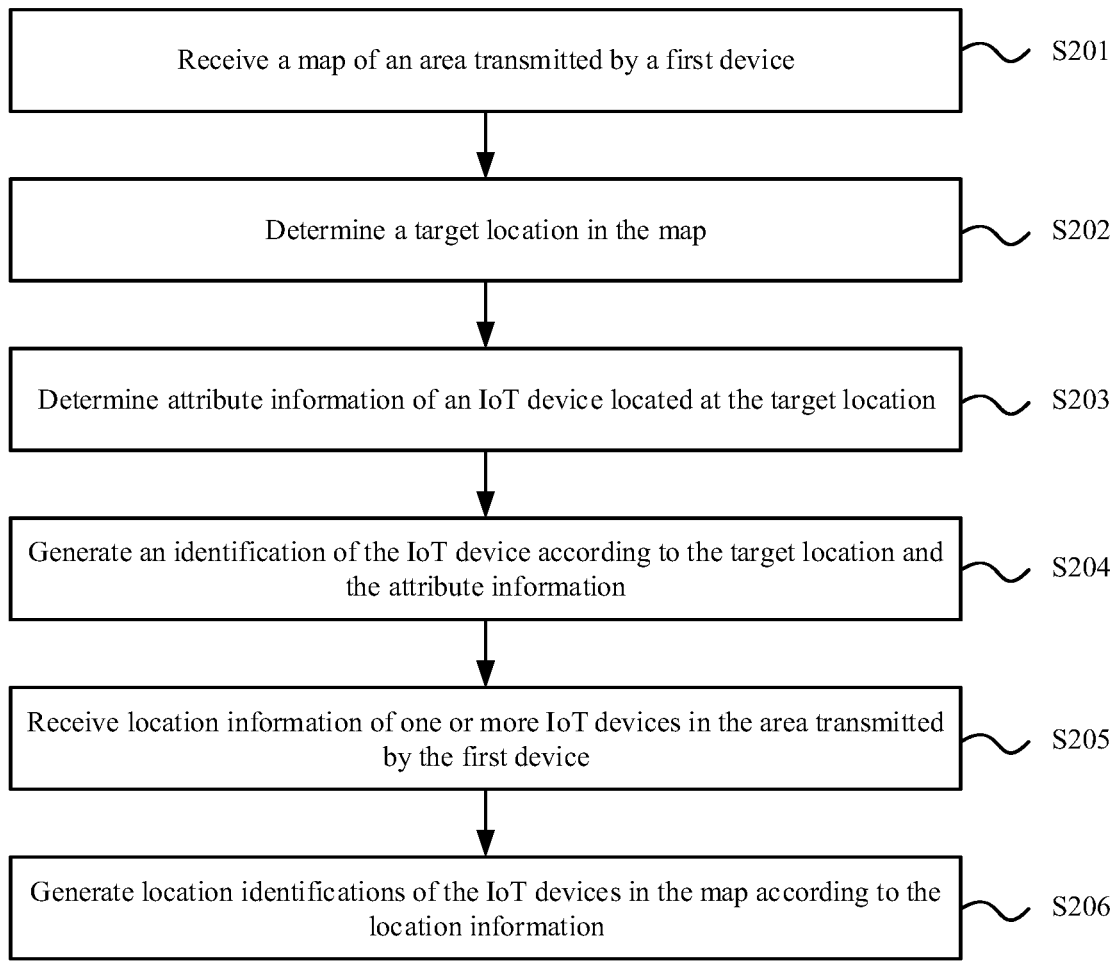
FIG. 17 is a schematic flowchart illustrating a method for setting an identification of an Internet of Things (IoT) device according to an embodiment of the present disclosure.

FIG. 17 is a schematic flowchart illustrating a method for setting an identification of an Internet of Things (IoT) device according to an embodiment of the present disclosure. As shown in FIG. 17, the method further includes following steps.

In step S205, location information of one or more IoT devices in the area transmitted by the first device is received.

In step S206, location identifications of the IoT devices in the map are generated according to the location information.

In one embodiment, each of the IoT devices can be provided with the first identification for indicating that the object provided with the first identification is the IoT device. The automatic cleaning robot can determine the object with the first identification in one or more objects in the area as the IoT device. For example, the first identification can be identified based on the images, or through other methods such as near field communication.

After identifying the first identification, the automatic cleaning robot can determine which locations in the map have IoT devices, that is, location information of the IoT devices in the map; and then transmit the determined location information to the control system. The control system can generate location identifications in the map according to the location information (for example, locations corresponding to the location information in the map), so that the map seen by the user can include the location identifications. Since the location identifications are generated according to the location information, corresponding location information can be viewed by operating the location identifications, so that the locations of the IoT devices in the area can be determined. The process of determining the location information of the IoT devices in the map does not require manual participation, thereby simplifying the operation.

In some examples, the location identifications are associated with the location information of the IoT devices in the area.

In one embodiment, each of the IoT devices can be provided with the first identification for indicating that the object provided with the first identification is the IoT device. The automatic cleaning robot can determine the object with the first identification in one or more objects in the area as the IoT device. For example, the first identification can be identified based on the images, or through other methods such as near field communication.

After identifying the first identification, the automatic cleaning robot can determine which locations in the map have IoT devices, generate location identifications in the map according to the location information (for example, locations corresponding to the location information in the map), and transmit the map including the location identifications to the control system for controlling the IoT devices, so that the map seen by the user can include the location identifications. Since the location identifications are generated according to the location information, corresponding location information can be viewed by operating the location identifications, so that the locations of the IoT devices in the area can be determined. The process of determining the location information of the IoT devices in the map does not require manual participation, thereby simplifying the operation.

Figure 18:
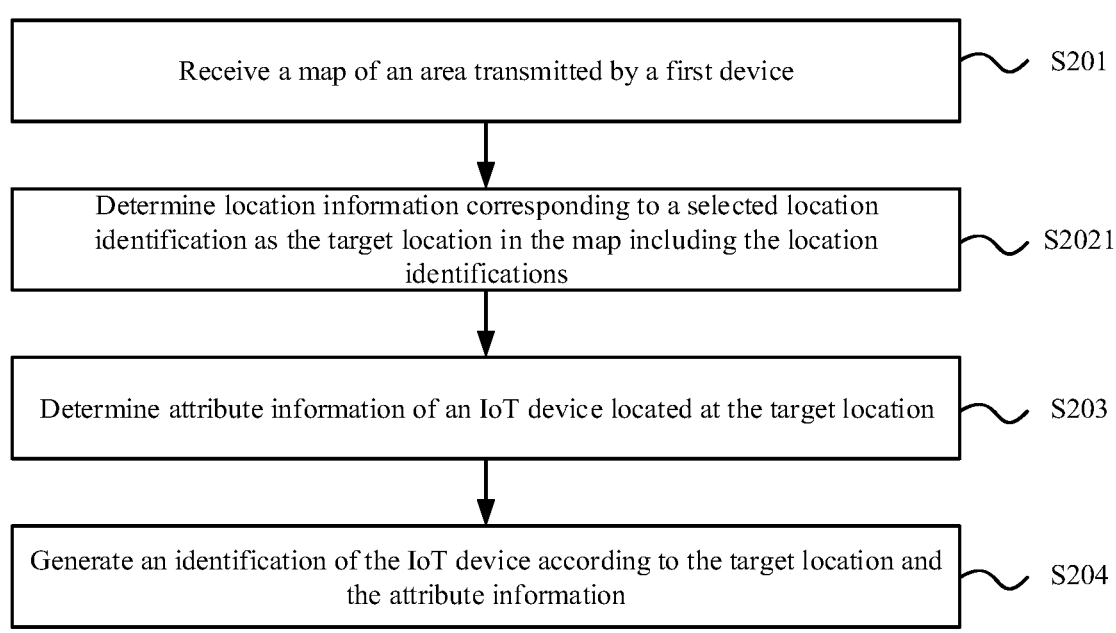
FIG. 18 is a schematic flowchart illustrating a method for setting an identification of an Internet of Things (IoT) device according to an embodiment of the present disclosure.

FIG. 18 is a schematic flowchart illustrating a method for setting an identification of an Internet of Things (IoT) device according to an embodiment of the present disclosure. As shown in FIG. 18, determining the target location in the map includes step S2021.

In step S2021, location information corresponding to a selected location identification is determined as the target location in the map including the location identifications.

In one embodiment, in response to that the map includes the locations of the IoT devices, the user can directly select a location identification in the map by inputting a first instruction, and determine a location corresponding to the selected location identification as the target location.

Figure 19:
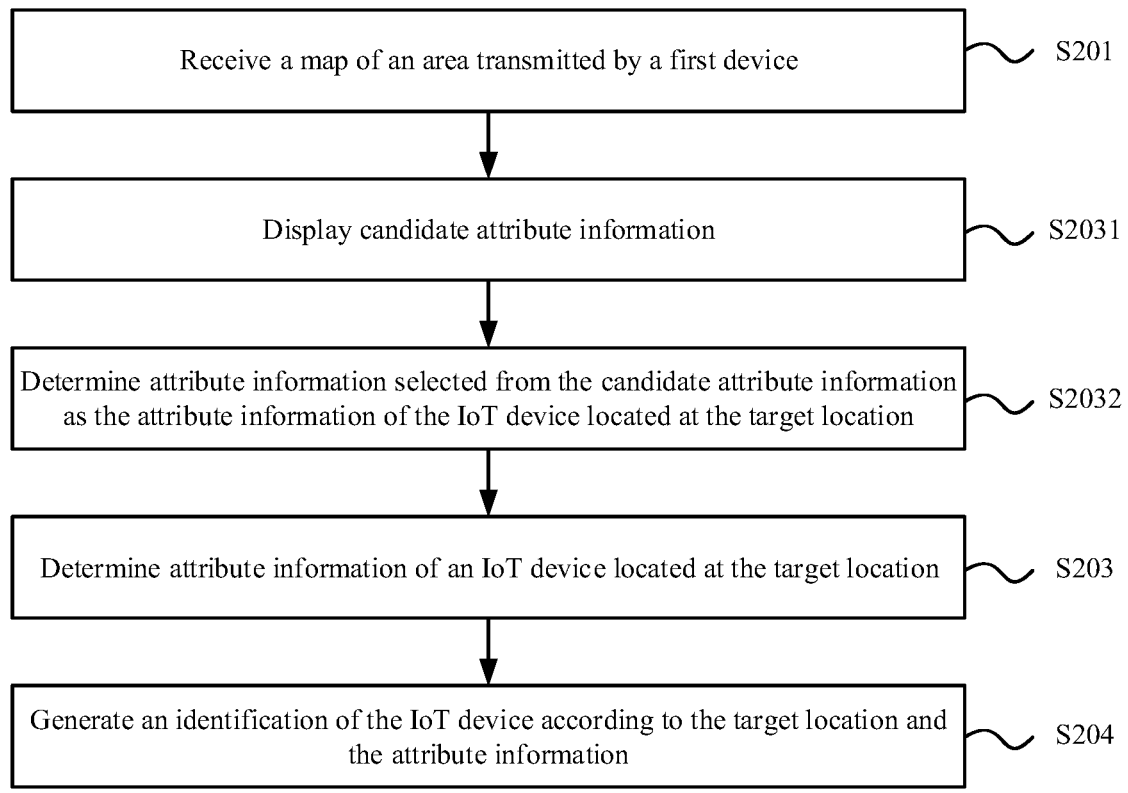
FIG. 19 is a schematic flowchart illustrating a method for setting an identification of an Internet of Things (IoT) device according to an embodiment of the present disclosure.

FIG. 19 is a schematic flowchart illustrating a method for setting an identification of an Internet of Things (IoT) device according to an embodiment of the present disclosure. As shown in FIG. 19, determining attribute information of an IoT device located at the target location includes following steps.

In step S2031, candidate attribute information is displayed.

In step S2032, attribute information selected from the candidate attribute information is determined as the attribute information of the IoT device located at the target location.

In one embodiment, the user can operate the location identification (for example, a click operation) to generate a display instruction, and candidate attribute information of the IoT devices can be displayed according to the display instruction. The user can operate the candidate attribute information of the IoT devices (for example, the click operation) to generate a selection instruction, and attribute information of an IoT device selected by the user can be determined as the attribute information of the IoT device located at the target location according to the selection instruction, thereby completing the setting of the attribute information of the IoT device located at the target location.

Corresponding to the aforementioned embodiments of the method for obtaining the map of the Internet of Things (IoT) device and the method for setting the identification of the Internet of Things (IoT) device, the present disclosure further provides embodiments of an apparatus for obtaining a map of an Internet of Things (IoT) device and an apparatus for setting an identification of an Internet of Things (IoT) device.

Figure 20:
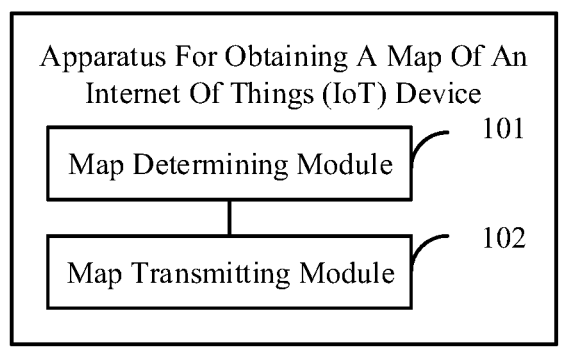
FIG. 20 is a schematic block diagram illustrating an apparatus for obtaining a map of an Internet of Things (IoT) device according to an embodiment of the present disclosure.

FIG. 20 is a schematic block diagram illustrating an apparatus for obtaining a map of an Internet of Things (IoT) device according to an embodiment of the present disclosure. The apparatus shown in this embodiment can be applied to a first device with a camera and being moveable. The first device can be an automatic cleaning robot, a mobile terminal with a camera, or virtual reality (VR) glasses with a camera. Taking the automatic cleaning robot as an example, the automatic cleaning robot can automatically clean an area (for example, a room), determine a map of an area to be cleaned, and plan a cleaning route in the map. In processes of route planning and cleaning, the automatic cleaning robot can determine its own location and orientation.

For example, the automatic cleaning robot can usually confirm a distance from a boundary (for example, a wall) through infrared LED or lidar, and confirm a travel and an orientation through a path integral of a gyroscope, and then its own location and orientation can be confirmed.

As shown in FIG. 20, the apparatus can include:
a map determining module 101 configured to determine a map of an area to be cleaned; and
a map transmitting module 102 configured to transmit the map to a control system for controlling one or more IoT devices.

In some examples, the first device can be one of:
an automatic cleaning robot,
a mobile terminal with a camera, or
virtual reality (VR) glasses with a camera.

Figure 21:
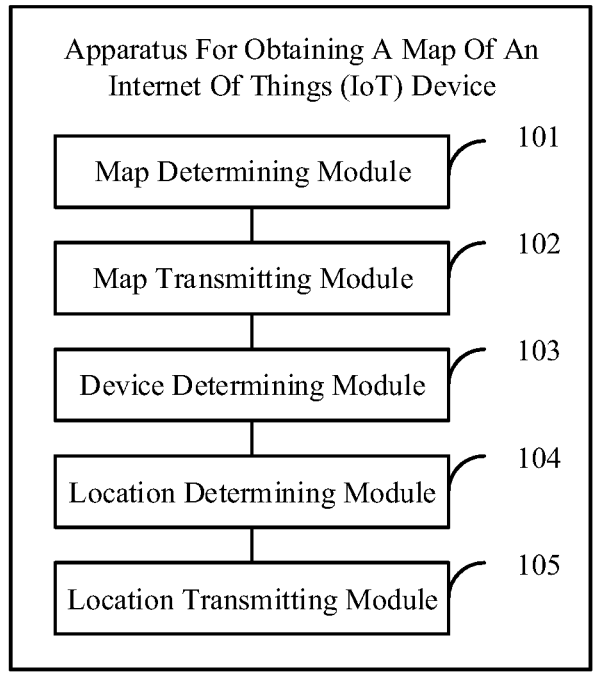
FIG. 21 is a schematic block diagram illustrating an apparatus for obtaining a map of an Internet of Things (IoT) device according to an embodiment of the present disclosure.

FIG. 21 is a schematic block diagram illustrating an apparatus for obtaining a map of an Internet of Things (IoT) device according to an embodiment of the present disclosure. As shown in FIG. 21, the apparatus further includes:
a device determining module 103 configured to determine one or more objects each having a first identification in the area as IoT devices;
a location determining module 104 configured to determine location information of the IoT devices in the map; and
a location transmitting module 105 configured to transmit the location information to the control system for controlling the IoT devices.

Figure 22:
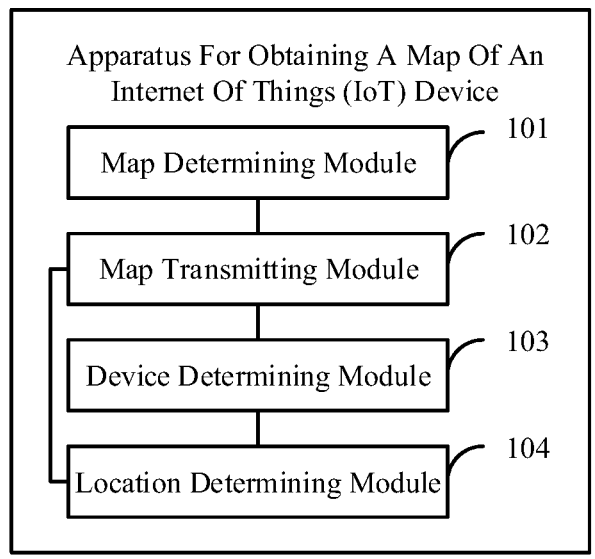
FIG. 22 is a schematic block diagram illustrating an apparatus for obtaining a map of an Internet of Things (IoT) device according to an embodiment of the present disclosure.

FIG. 22 is a schematic block diagram illustrating an apparatus for obtaining a map of an Internet of Things (IoT) device according to an embodiment of the present disclosure. As shown in FIG. 22, the apparatus further includes:
a device determining module 103 configured to determine one or more objects each having a first identification in the area as IoT devices; and
a location determining module 104 configured to determine location information of the IoT devices in the map,
where the map transmitting module 102 is configured to generate location identifications in the map according to the location information; and transmit the map including the location identifications to the control system for controlling the IoT devices.

Figure 23:
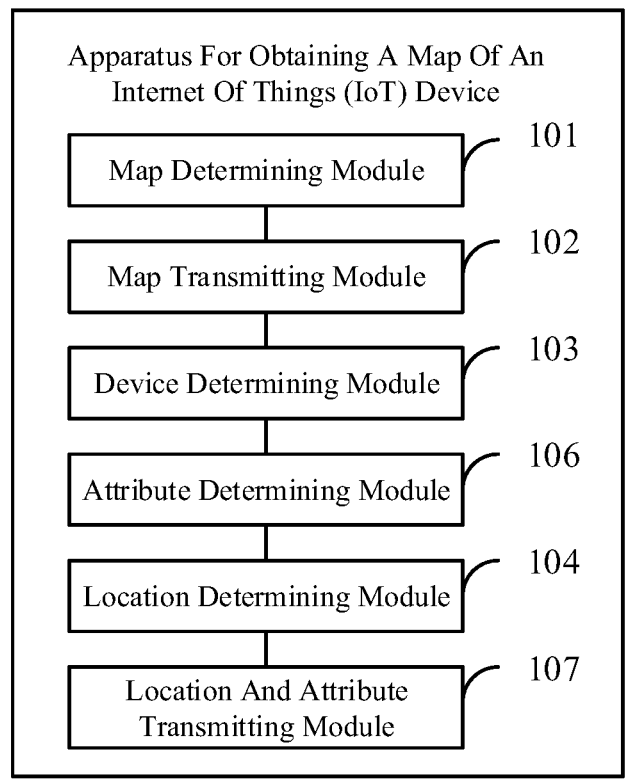
FIG. 23 is a schematic block diagram illustrating an apparatus for obtaining a map of an Internet of Things (IoT) device according to an embodiment of the present disclosure.

FIG. 23 is a schematic block diagram illustrating an apparatus for obtaining a map of an Internet of Things (IoT) device according to an embodiment of the present disclosure. As shown in FIG. 23, the apparatus further includes:
a device determining module 103 configured to determine one or more objects each having a first identification in the area as IoT devices;
an attribute determining module 106 configured to determine attribute information of the IoT devices according to a second identification on each of the IoT devices;
a location determining module 104 configured to determine location information of the IoT devices in the map; and
a location and attribute transmitting module 107 configured to transmit the location information and the attribute information to the control system for controlling the IoT devices.

Figure 24:
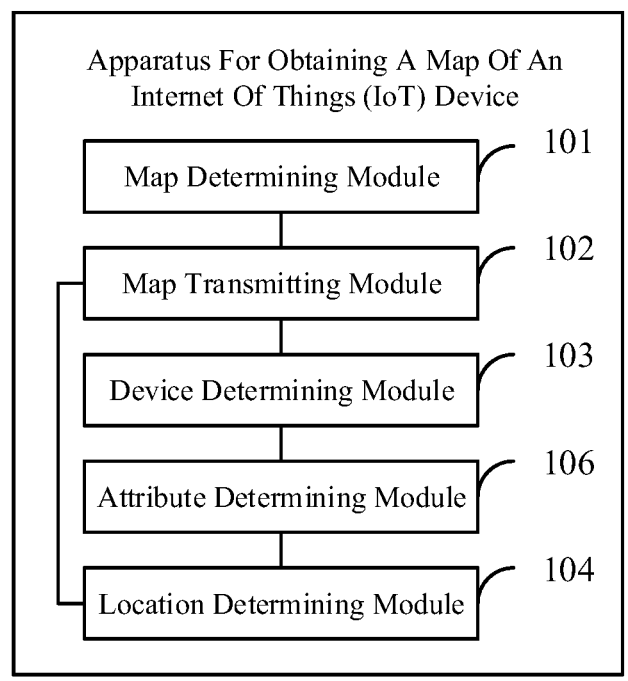
FIG. 24 is a schematic block diagram illustrating an apparatus for obtaining a map of an Internet of Things (IoT) device according to an embodiment of the present disclosure.

FIG. 24 is a schematic block diagram illustrating an apparatus for obtaining a map of an Internet of Things (IoT) device according to an embodiment of the present disclosure. As shown in FIG. 24, the apparatus further includes:
a device determining module 103 configured to determine one or more objects with each having a first identification in the area as IoT devices;
an attribute determining module 106 configured to determine attribute information of the IoT devices according to a second identification on each of the IoT devices; and
a location determining module 104 configured to determine location information of the IoT devices in the map,
where the map transmitting module 102 is configured to generate location identifications in the map according to the location information; establish an association relationship between the location identifications and the attribute information; and transmit the map including the location identifications to the control system for controlling the IoT devices, so that the control system for controlling the IoT devices determines the location information and the attribute information of the IoT devices in the map according to the location identifications.

Figure 25:
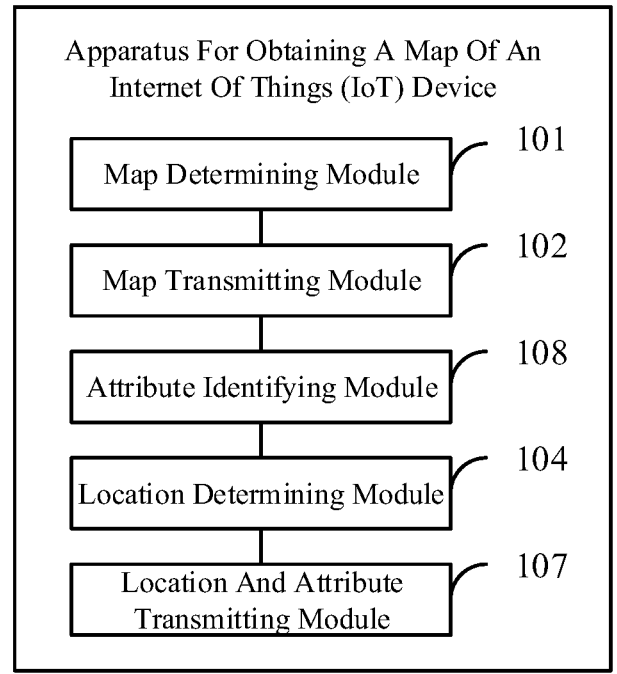
FIG. 25 is a schematic block diagram illustrating an apparatus for obtaining a map of an Internet of Things (IoT) device according to an embodiment of the present disclosure.

FIG. 25 is a schematic block diagram illustrating an apparatus for obtaining a map of an Internet of Things (IoT) device according to an embodiment of the present disclosure. As shown in FIG. 25, the apparatus further includes:

an attribute identifying module 108 configured to identify one or more IoT devices in the area and attribute information of the IoT devices through an identification algorithm;

a location determining module 104 configured to determine location information of the IoT devices in the map; and a location and attribute transmitting module 107 configured to transmit the location information and the attribute information to the control system for controlling the IoT devices.

Figure 26:
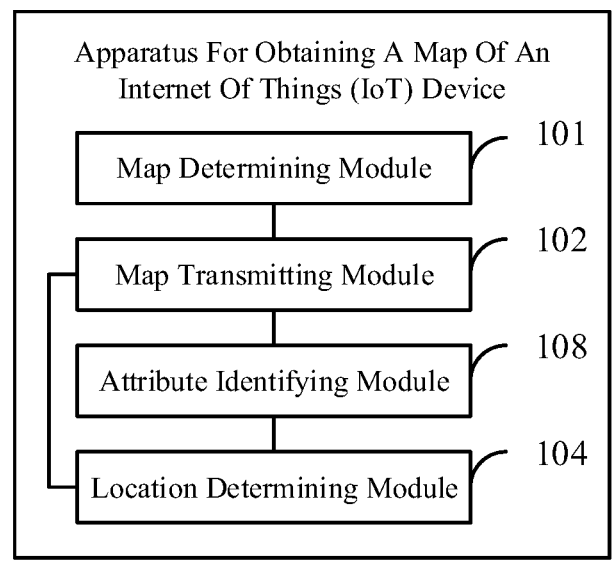
FIG. 26 is a schematic block diagram illustrating an apparatus for obtaining a map of an Internet of Things (IoT) device according to an embodiment of the present disclosure.

FIG. 26 is a schematic block diagram illustrating an apparatus for obtaining a map of an Internet of Things (IoT) device according to an embodiment of the present disclosure. As shown in FIG. 26, the apparatus further includes:

an attribute identifying module 108 configured to identify one or more IoT devices in the area and attribute information of the IoT devices through an identification algorithm; and a location determining module 104 configured to determine location information of the IoT devices in the map, where the map transmitting module 102 is configured to generate location identifications in the map according to the location information; establish an association relationship between the location identifications and the attribute information; and transmit the map including the location identifications to the control system for controlling the IoT devices, so that the control system for controlling the IoT devices determines the location information and the attribute information of the IoT devices in the map according to the location identifications.

Figure 27:
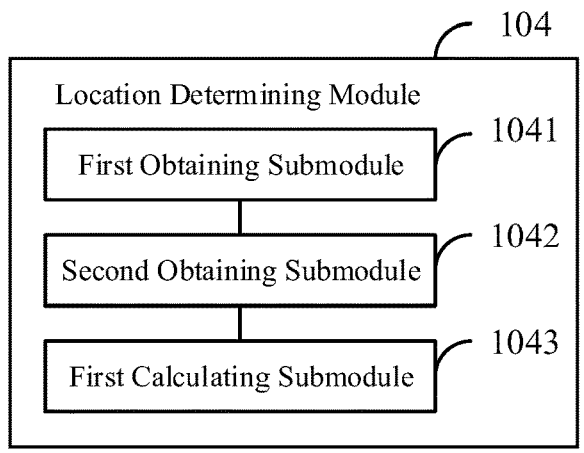
FIG. 27 is a schematic block diagram illustrating a location determining module according to an embodiment of the present disclosure.

FIG. 27 is a schematic block diagram illustrating a location determining module according to an embodiment of the present disclosure. As shown in FIG. 27, the location determining module 104 includes:

a first obtaining submodule 1041 configured to, for each of the IoT devices, obtain a first location of the first device when the IoT device is identified and a first angle between a first direction that the first device at the first location is oriented towards the IoT device and a preset direction;

a second obtaining submodule 1042 configured to obtain a second location of the first device when the IoT device is identified again and a second angle between a second direction that the first device at the second location is oriented towards the IoT device and the preset direction; and a first calculating submodule 1043 configured to determine a location of the IoT device according to the first location, the second location, the first angle and the second angle.

Figure 28:
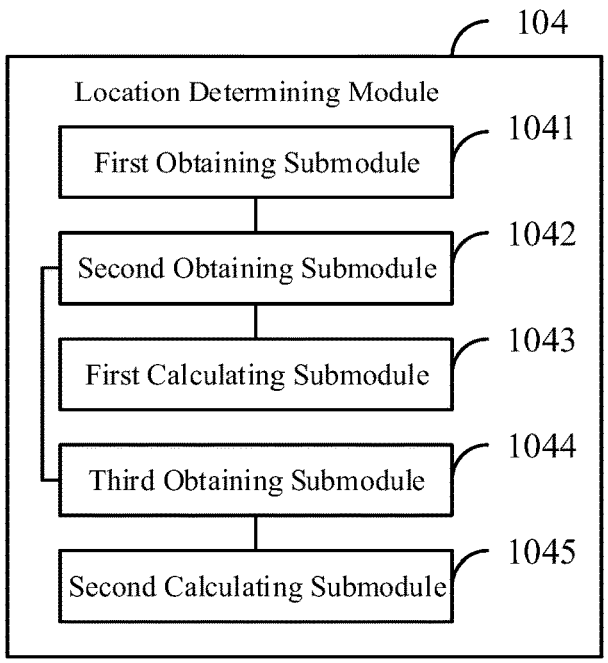
FIG. 28 is a schematic block diagram illustrating a location determining module according to an embodiment of the present disclosure.

FIG. 28 is a schematic block diagram illustrating a location determining module according to an embodiment of the present disclosure. As shown in FIG. 28, the location determining module 104 further includes:

a third obtaining submodule 1044 configured to, in response to determining a plurality of IoT devices when the first device is at the first location and determining the plurality of IoT devices when the first device is at the second location, determine a third location of the first device when at least one of the plurality of IoT devices is identified, and a third angle between a third direction that the first device at the third location is oriented towards each of the plurality of IoT devices and the preset direction, wherein the third location is different from the first location and the second location; and a second calculating submodule 1045 configured to determine locations of the plurality of IoT devices according to the third location and corresponding third angles.

Figure 29:
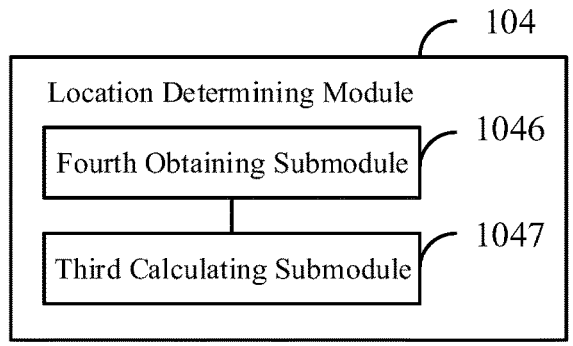
FIG. 29 is a schematic block diagram illustrating a location determining module according to an embodiment of the present disclosure.

FIG. 29 is a schematic block diagram illustrating a location determining module according to an embodiment of the present disclosure. As shown in FIG. 29, the location determining module 104 includes:

a fourth obtaining submodule 1046 configured to, for each of the IoT devices, obtain a first location of the first device when the IoT device is identified, a first angle between a first direction that the first device at the first location is oriented towards the IoT device and a preset direction, and depth information of the IoT device in an image obtained by the first device; and a third calculating submodule 1047 configured to determine a location of the IoT device according to the first location, the first angle and the depth information.

In some examples, the location determining module 104 is further configured to update the location information of the IoT devices; and the map transmitting module 102 is further configured to transmit updated location information of the IoT devices to the control system for controlling the IoT devices, or updating the location information in the map according to the updated location information of the IoT devices and transmitting an updated map to the control system for controlling the IoT devices.

Figure 30:
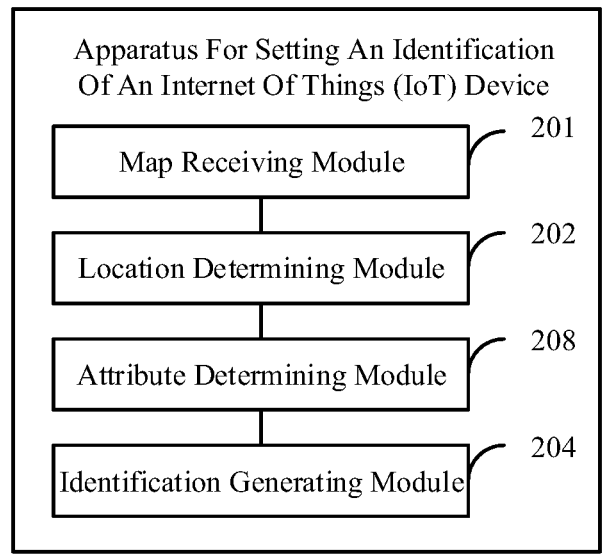
FIG. 30 is a schematic block diagram illustrating an apparatus for setting an identification of an Internet of Things (IoT) device according to an embodiment of the present disclosure.

FIG. 30 is a schematic block diagram illustrating an apparatus for setting an identification of an Internet of Things (IoT) device according to an embodiment of the present disclosure. The apparatus shown in this embodiment can be applied to a control system for controlling one or more IoT devices, and the control system for controlling the one or more IoT devices can communicate with the automatic cleaning robot described in any of the above embodiments.

As shown in FIG. 30, the apparatus can include:

a map receiving module 201 configured to receive a map of an area transmitted by a first device;

a location determining module 202 configured to determine a target location in the map;

an attribute determining module 203 configured to determine attribute information of an IoT device located at the target location; and an identification generating module 204 configured to generate an identification of the IoT device according to the target location and the attribute information.

Figure 31:
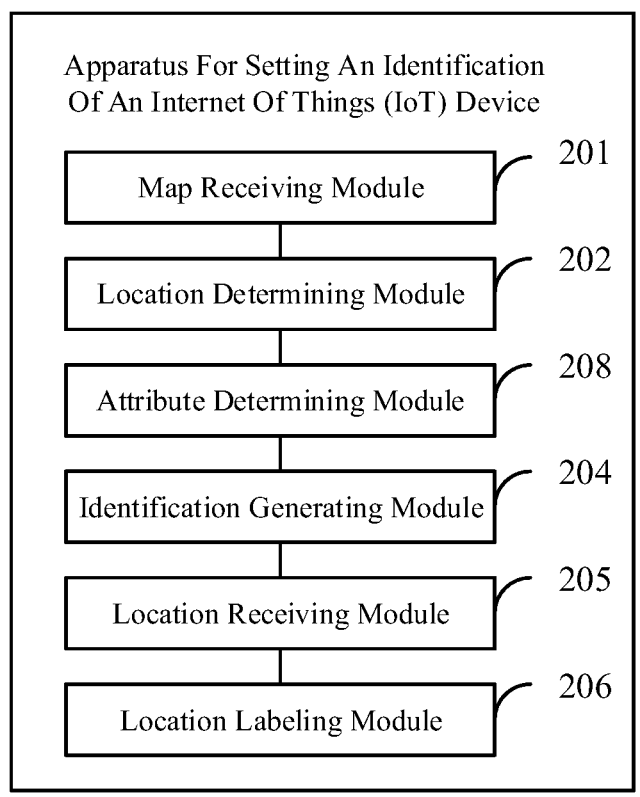
FIG. 31 is a schematic block diagram illustrating an apparatus for setting an identification of an Internet of Things (IoT) device according to an embodiment of the present disclosure.

FIG. 31 is a schematic block diagram illustrating an apparatus for setting an identification of an Internet of Things (IoT) device according to an embodiment of the present disclosure. As shown in FIG. 31, the apparatus further includes:

a location receiving module 205 configured to receive location information of one or more IoT devices in the area transmitted by the first device; and a location labeling module 206 configured to generate location identifications of the IoT devices in the map according to the location information.

In some examples, the map includes location identifications associated with location information of one or more IoT devices in the area.

In some examples, the location determining module 202 is configured to determine, in the map including the location identifications, location information corresponding to a selected location identification as the target location.

In some examples, the attribute determining module 203 is configured to display candidate attribute information; and determine attribute information selected from the candidate attribute information as the attribute information of the IoT device located at the target location.

Regarding the apparatus in the above embodiment, the specific manner in which each module performs the operation has been described in detail in the embodiment of the method, which will not be elaborated here.

For the apparatus embodiment, since it basically corresponds to the method embodiment, the relevant part may refer to the part of the description of the method embodiment. The apparatus embodiments described above are merely illustrative, where the units described as separate components may or may not be physically separated, and the components displayed as units may or may not be physical units. That is, they may be located in one place or may be distributed to a plurality of network units. Some or all of the modules may be selected according to actual needs, to achieve the objectives of the solutions of the present disclosure. Those skilled in the art may understand and implement without creative labor.

According to the embodiments of the present disclosure, there is provided an electronic device, including:
a processor; and
a memory for storing instructions executable by the processor,
where the processor is configured to implement the method for obtaining the map of the Internet of Things (IoT) device described in any of the above embodiments.

According to the embodiments of the present disclosure, there is provided an electronic device, including:
a processor; and
a memory for storing instructions executable by the processor,
where the processor is configured to implement the method for setting the identification of the Internet of Things (IoT) device described in any of the above embodiments.

According to the embodiments of the present disclosure, there is provided a computer readable storage medium storing a computer program, where the computer program, when executed by a processor, causing the processor to implement the steps of the method for obtaining the map of the Internet of Things (IoT) device described in any of the above embodiments.

According to the embodiments of the present disclosure, there is provided a computer readable storage medium storing a computer program, where the computer program, when executed by a processor, causing the processor to implement the steps of the method for setting the identification of the Internet of Things (IoT) device described in any of the above embodiments.

Figure 32:
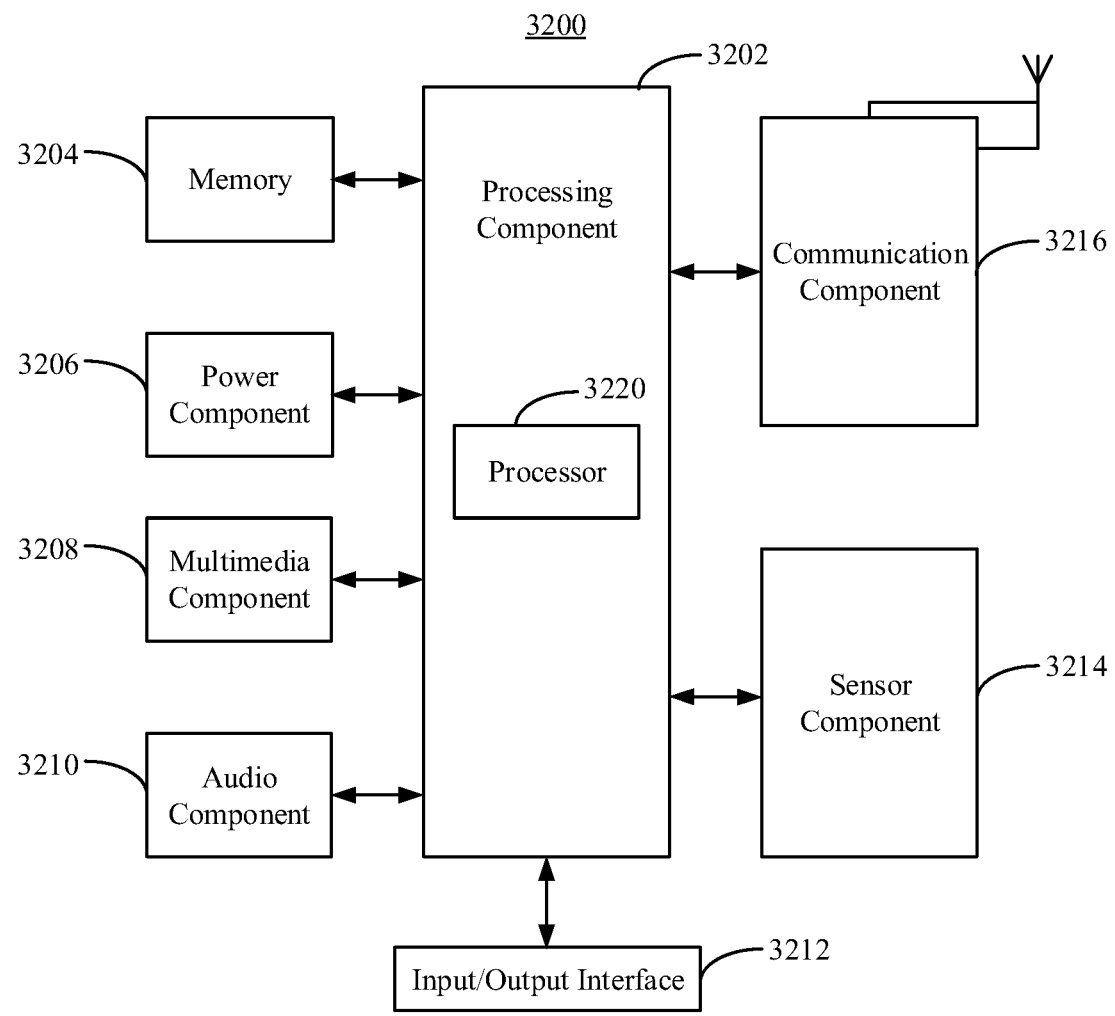
FIG. 32 is a schematic block diagram illustrating an apparatus for setting a location label of an Internet of Things (IoT) device and/or an identification of an Internet of Things (IoT) device according to an embodiment of the present disclosure.

FIG. 32 is a schematic block diagram illustrating an apparatus 3200 for setting a location label of an Internet of Things (IoT) device and/or an identification of an Internet of Things (IoT) device according to an embodiment of the present disclosure. For example, the apparatus 3200 can be a mobile telephone, a computer, a digital broadcasting terminal, a message receiving and transmitting device, a game console, a tablet device, a medical device, a fitness device, a personal digital assistant, and the like.

Referring to FIG. 32, the apparatus 3200 may include one or more of the following components: a processing component 3202, a memory 3204, a power supply component 3206, a multimedia component 3208, an audio component 3210, an input/output (I/O) interface 3212, a sensor component 3214 and a communication component 3216.

The processing component 3202 generally controls overall operations of the apparatus 3200, such as operations associated with display, phone calls, data communications, camera operations, and recording operations. The processing component 3202 may include one or more processors 3220 to execute instructions to complete all or part of the steps of the above methods. In addition, the processing component 3202 may include one or more modules which facilitate the interaction between the processing component 3202 and other components. For example, the processing component 3202 may include a multimedia module to facilitate the interaction between the multimedia component 3208 and the processing component 3202.

The memory 3204 is to store various types of data to support the operation of the apparatus 3200. Examples of such data include instructions for any application or method operated on the apparatus 3200, contact data, phonebook data, messages, pictures, videos, and so on. The memory 3204 may be implemented by any type of volatile or non-volatile storage devices or a combination thereof, such as a Static Random-Access Memory (SRAM), an Electrically-Erasable Programmable Read Only Memory (EEPROM), an Erasable Programmable Read Only Memory (EPROM), a Programmable read-only memory (PROM), a Read Only Memory (ROM), a magnetic memory, a flash memory, a magnetic or optical disk.

The power supply component 3206 provides power to different components of the apparatus 3200. The power supply component 3206 may include a power management system, one or more power supplies, and other components associated with generating, managing, and distributing power for the apparatus 3200.

The multimedia component 3208 includes a screen providing an output interface between the apparatus 3200 and a user. In some embodiments, the screen may include a Liquid Crystal Display (LCD) and a Touch Panel (TP). If the screen includes the TP, the screen may be implemented as a touch screen to receive input signals from the user. The TP may include one or more touch sensors to sense touches, swipes, and gestures on the TP. The touch sensors may not only sense a boundary of a touch or swipe, but also sense duration and a pressure associated with the touch or swipe. In some embodiments, the multimedia component 3208 may include a front camera and/or a rear camera. The front camera and/or rear camera may receive external multimedia data when the apparatus 3200 is in an operating mode, such as a photographing mode or a video mode. Each of the front camera and the rear camera may be a fixed optical lens system or have focal length and optical zooming capability.

The audio component 3210 is configured to output and/or input an audio signal. For example, the audio component 3210 includes a microphone (MIC). When the apparatus 3200 is in an operating mode, such as a call mode, a recording mode, and a voice recognition mode, the MIC is to receive an external audio signal. The received audio signal may be further stored in the memory 3204 or transmitted via the communication component 3216. In some embodiments, the audio component 3210 further includes a speaker to output an audio signal.

The I/O interface 3212 may provide an interface between the processing component 3202 and peripheral interface modules. The above peripheral interface modules may include a keyboard, a click wheel, buttons and so on. These buttons may include, but are not limited to, a home button, a volume button, a starting button and a locking button.

The sensor component 3214 includes one or more sensors to provide status assessments of various aspects for the apparatus 3200. For example, the sensor component 3214 may detect the on/off status of the apparatus 3200, and relative positioning of component, for example, the component is a display and a keypad of the apparatus 3200. The sensor component 3214 may also detect a change in position of the apparatus 3200 or a component of the apparatus 3200, a presence or absence of the contact between a user and the apparatus 3200, an orientation or an acceleration/deceleration of the apparatus 3200, and a change in temperature of the apparatus 3200. The sensor component 3214 may include a proximity sensor to detect the presence of a nearby object without any physical contact. The sensor component 3214 may further include an optical sensor, such as a Complementary Metal Oxide Semiconductor (CMOS) or Charge-coupled Device (CCD) image sensor which is used in imaging applications. In some embodiments, the sensor component 3214 may further include an acceleration sensor, a gyroscope sensor, a magnetic sensor, a pressure sensor, or a temperature sensor.

The communication component 3216 is to facilitate wired or wireless communication between the apparatus 3200 and other devices. The apparatus 3200 may access a wireless network that is based on a communication standard, such as Wi-Fi, 2G or 3G, or a combination thereof. In an exemplary embodiment, the communication component 3216 receives a broadcast signal or broadcast-associated information from an external broadcast management system via a broadcast channel. In an exemplary embodiment, the communication component 3216 further includes a Near Field Communication (NFC) module to facilitate short-range communications. For example, the NFC module may be implemented based on a Radio Frequency Identification (RFID) technology, an Infrared Data Association (IrDA) technology, an Ultra-Wide Band (UWB) technology, a Blue Tooth (BT) technology and other technologies.

In an exemplary embodiment, the apparatus 3200 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, microcontrollers, microprocessors, or other electronic components for performing the above method.

In an exemplary embodiment, there is also provided a non-transitory computer readable storage medium including instructions, such as the memory 3204 including instructions. The instructions may be executed by the processor 3220 of the apparatus 3200 to perform the above described methods. For example, the non-transitory computer readable storage medium may be a ROM, a Random Access Memory (RAM), a CD-ROM, a magnetic tape, a floppy disk, an optical data storage device, and the like.

Other implementations of the present disclosure will be apparent to those skilled in the art from consideration of the specification and practice of the present disclosure herein. The present disclosure is intended to cover any variations, uses, modification or adaptations of the present disclosure that follow the general principles thereof and include common knowledge or conventional technical means in the art that are not disclosed in the present disclosure. The specification and examples are considered as exemplary only, with a true scope and spirit of the present disclosure being indicated by the following claims.

It should be understood that the present disclosure is not limited to the above described structures shown in the drawings, and various modifications and changes can be made to the present disclosure without departing from the scope thereof. The scope of the present disclosure is to be limited only by the appended claims.

It should be noted that the relational terms such as "first" and "second" used herein are merely intended to distinguish one entity or operation from another entity or operation rather than to require or imply any such actual relation or order existing between these entities or operations. Also, the terms "including", "containing", or any variation thereof is intended to cover non-exclusive inclusion, so that a process, method, article, or device including a series of elements includes not only those elements but also other elements not listed explicitly or those elements inherent to such a process, method, article, or device. Without more limitations, an element defined by the statement "including a . . . " shall not be precluded to include additional same elements present in the process, method, article or device including the elements.

The methods and apparatuses provided by the embodiments of the present disclosure have been described in detail above. Specific examples are used herein to explain the principles and implementations of the present disclosure. The description of the above embodiments is only used to help understand methods and core ideas in the present disclosure. At the same time, those of ordinary skill in the art can apply some changes in the specific implementation and the scope of application based on the idea of the present disclosure. In conclusion, the content of the present specification should not be construed as any limitation to the present disclosure.

According to an aspect of the embodiments of the present disclosure, there is provided a method for obtaining a map of an Internet of Things (IoT) device, being applicable to a first device with a camera and being moveable, the method includes: determining a map of an area; and transmitting the map to a control system for controlling one or more IoT devices.

In some embodiments, the first device is one of: an automatic cleaning robot, a mobile terminal with a camera, or virtual reality (VR) glasses with a camera.

In some embodiments, the method further includes: determining one or more objects each having a first identification in the area as IoT devices; determining location information of the IoT devices in the map; and transmitting the location information to the control system for controlling the IoT devices.

In some embodiments, the method further includes: determining one or more objects each having a first identification in the area as IoT devices; and determining location information of the IoT devices in the map, where transmitting the map to the control system for controlling the IoT devices includes: generating location identifications in the map according to the location information; and transmitting the map including the location identifications to the control system for controlling the IoT devices.

In some embodiments, the method further includes: determining one or more objects each having a first identification in the area as IoT devices; determining attribute information of the IoT devices according to a second identification on each of the IoT devices; determining location information of the IoT devices in the map; and transmitting the location information and the attribute information to the control system for controlling the IoT devices.

In some embodiments, the method further includes: determining one or more objects with each having a first identification in the area as IoT devices; determining attribute information of the IoT devices according to a second identification on each of the IoT devices; and determining location information of the IoT devices in the map, where transmitting the map to the control system for controlling the IoT devices includes: generating location identifications in the map according to the location information; establishing an association relationship between the location identifications and the attribute information; and transmitting the map including the location identifications to the control system for controlling the IoT devices, so that the control system for controlling the IoT devices determines the location information and the attribute information of the IoT devices in the map according to the location identifications.

In some embodiments, the method further includes: identifying one or more IoT devices in the area and attribute information of the IoT devices through an identification algorithm; determining location information of the IoT devices in the map; and transmitting the location information and the attribute information to the control system for controlling the IoT devices.

In some embodiments, the method further includes: identifying one or more IoT devices in the area and attribute information of the IoT devices through an identification algorithm; and determining location information of the IoT devices in the map, where transmitting the map to the control system for controlling the IoT devices includes: generating location identifications in the map according to the location information; establishing an association relationship between the location identifications and the attribute information; and transmitting the map including the location identifications to the control system for controlling the IoT devices, so that the control system for controlling the IoT devices determines the location information and the attribute information of the IoT devices in the map according to the location identifications.

In some embodiments, determining the location information of the IoT devices in the map includes: for each of the IoT devices, obtaining a first location of the first device when the IoT device is identified and a first angle between a first direction that the first device at the first location is oriented towards the IoT device and a preset direction; obtaining a second location of the first device when the IoT device is identified again and a second angle between a second direction that the first device at the second location is oriented towards the IoT device and the preset direction; and determining a location of the IoT device according to the first location, the second location, the first angle and the second angle.

In some embodiments, determining the location information of the IoT devices in the map further includes: in response to determining a plurality of IoT devices when the first device is at the first location and determining the plurality of IoT devices when the first device is at the second location, determining a third location of the first device when at least one of the plurality of IoT devices is identified, and a third angle between a third direction that the first device at the third location is oriented towards each of the plurality of IoT devices and the preset direction, wherein the third location is different from the first location and the second location; and determining locations of the plurality of IoT devices according to the third location and corresponding third angles.

In some embodiments, determining the location information of the IoT devices in the map includes: for each of the IoT devices, obtaining a first location of the first device when the IoT device is identified, a first angle between a first direction that the first device at the first location is oriented towards the IoT device and a preset direction, and depth information of the IoT device in an image obtained by the first device; and determining a location of the IoT device according to the first location, the first angle and the depth information.

In some embodiments, the method further includes: updating the location information of the IoT devices; and transmitting updated location information of the IoT devices to the control system for controlling the IoT devices, or updating the location information in the map according to the updated location information of the IoT devices and transmitting an updated map to the control system for controlling the IoT devices.

According to an aspect of the embodiments of the present disclosure, there is provided a method for setting an identification of an Internet of Things (IoT) device, including: receiving a map of an area transmitted by a first device; determining a target location in the map; determining attribute information of an IoT device located at the target location; and generating an identification of the IoT device according to the target location and the attribute information.

In some embodiments, the method further includes: receiving location information of one or more IoT devices in the area transmitted by the first device; and generating location identifications of the IoT devices in the map according to the location information.

In some embodiments, the map includes location identifications associated with location information of one or more IoT devices in the area.

In some embodiments, determining the target location in the map includes: determining, in the map including the location identifications, location information corresponding to a selected location identification as the target location.

In some embodiments, determining the attribute information of the IoT device located at the target location includes: displaying candidate attribute information; and determining attribute information selected from the candidate attribute information as the attribute information of the IoT device located at the target location.

The invention claimed is:

1. A method for obtaining a map of an Internet of Things (IoT) device, performed by a first device with a camera and being moveable, the method comprising:
    determining a map of an area; and
    transmitting the map to a control system for controlling one or more IoT devices;
    wherein the method further comprises:
    determining one or more objects with each having a first identification in the area as the one or more IoT devices, wherein the first identification indicates that an object provided with the first identification is an IoT device;
    determining attribute information of each of the one or more IoT devices according to a second identification on each of the one or more IoT devices, wherein the second identification indicates attribute information of an object provided with the second identification; and
    determining location information of each of the one or more IoT devices in the map, wherein transmitting the map to the control system for controlling the one or more IoT devices comprises:

generating location identifications in the map according to the location information;

establishing an association relationship between the location identifications and the attribute information; and transmitting the map comprising the location identifications to the control system for controlling the one or more IoT devices, so that the control system for controlling the one or more IoT devices determines the location information and the attribute information of the IoT devices in the map according to the location identifications.

2. The method according to claim 1, wherein the first device is one of:

an automatic cleaning robot, a mobile terminal with the camera, or virtual reality (VR) glasses with the camera.

3. The method according to claim 1, wherein determining the location information of each of the one or more IoT devices in the map comprises:

for each respective IoT device of the one or more IoT devices, obtaining a first location of the first device when the respective IoT device is identified and a first angle between a first direction that the first device at the first location is oriented towards the respective IoT device and a preset direction;

obtaining a second location of the first device when the respective IoT device is identified again and a second angle between a second direction that the first device at the second location is oriented towards the respective IoT device and the preset direction; and determining a location of the respective IoT device according to the first location, the second location, the first angle and the second angle.

4. The method according to claim 3, wherein determining the location information of each of the one or more IoT devices in the map further comprises:

in response to determining a plurality of IoT devices when the first device is at the first location and determining the plurality of IoT devices when the first device is at the second location, determining a third location of the first device when at least one of the plurality of IoT devices is identified, and a third angle between a third direction that the first device at the third location is oriented towards each of the plurality of IoT devices and the preset direction, wherein the third location is different from the first location and the second location; and determining locations of the plurality of IoT devices according to the third location and corresponding third angles.

5. The method according to claim 1, wherein determining the location information of each of the one or more IoT devices in the map comprises:

for each respective IoT device of the one or more IoT devices, obtaining a first location of the first device when the respective IoT device is identified, a first angle between a first direction that the first device at the first location is oriented towards the respective IoT device and a preset direction, and depth information of the respective IoT device in an image obtained by the first device; and determining a location of the respective IoT device according to the first location, the first angle and the depth information.

6. The method according to claim 1, further comprising:

updating the location information of the IoT devices; and transmitting updated location information of the IoT devices to the control system for controlling the IoT devices, or updating the location information in the map according to the updated location information of the IoT devices and transmitting an updated map to the control system for controlling the IoT devices.

7. An electronic device, comprising:

a memory for storing instructions;

one or more processors that are communicatively coupled to the memory, wherein the one or more processors are collectively configured to:

determine a map of an area; and transmit the map to a control system for controlling one or more IoT devices;

determine one or more objects with each having a first identification in the area as the one or more IoT devices, wherein the first identification indicates that an object provided with the first identification is an IoT device;

determine attribute information of each of the one or more IoT devices according to a second identification on each of the one or more IoT devices, wherein the second identification indicates attribute information of an object provided with the second identification; and determine location information of each of the one or more IoT devices in the map, wherein when transmitting the map to the control system for controlling the one or more IoT devices, the one or more processors collectively:

generate location identifications in the map according to the location information;

establish an association relationship between the location identifications and the attribute information; and transmit the map comprising the location identifications to the control system for controlling the one or more IoT devices, so that the control system for controlling the one or more IoT devices determines the location information and the attribute information of the IoT devices in the map according to the location identifications.

8. A non-transitory computer readable storage medium storing a computer program, wherein the computer program, when executed by a processor of the first device, cause the first device to perform the method according to claim 1.

* * * * *